US012212083B2

(12) United States Patent
Burris et al.

(10) Patent No.: US 12,212,083 B2
(45) Date of Patent: Jan. 28, 2025

(54) COMPRESSIBLE ELECTRICAL ASSEMBLIES WITH DIVARICATED-CUT SECTIONS

(71) Applicant: CORNING OPTICAL COMMUNICATIONS RF LLC, Glendale, AZ (US)

(72) Inventors: Donald Andrew Burris, Peoria, AZ (US); Thomas Edmond Flaherty, IV, Surprise, AZ (US); Daniel Michael Grabowski, Goodyear, AZ (US)

(73) Assignee: CORNING OPTICAL COMMUNICATIONS RF LLC, Glendale, AZ (US)

( * ) Notice: Subject to any disclaimer, the term of this patent is extended or adjusted under 35 U.S.C. 154(b) by 577 days.

(21) Appl. No.: 17/522,416

(22) Filed: Nov. 9, 2021

(65) Prior Publication Data

US 2022/0173535 A1 Jun. 2, 2022

Related U.S. Application Data

(60) Provisional application No. 63/119,578, filed on Nov. 30, 2020.

(51) Int. Cl.
*H01R 11/09* (2006.01)
*H01R 12/52* (2011.01)
(Continued)

(52) U.S. Cl.
CPC ........... *H01R 11/09* (2013.01); *H01R 12/523* (2013.01); *H01R 12/58* (2013.01); *H01R 2103/00* (2013.01)

(58) Field of Classification Search
CPC ...... H01R 11/09; H01R 12/523; H01R 12/58; H01R 2103/00
See application file for complete search history.

(56) References Cited

U.S. PATENT DOCUMENTS 4,778,404 A 10/1988 Pass
4,790,700 A 12/1988 Schwartzman
(Continued)

FOREIGN PATENT DOCUMENTS

CN 1930737 A 3/2007
CN 201233990 Y 5/2009
(Continued)

OTHER PUBLICATIONS

Electrical contacts. (Design—(Copyrights) Questel) orbit.com. [Online PDF compilation of references] 11 pgs. Print Dates Range Jul. 3, 2015-May 24, 2017 [Retrieved Feb. 23, 2021] https://www.orbit.com/export/UCZAH96B/pdf4/2337c902-fff4-4212-aef3-b9ca7ff304ee-213245.pdf (Year: 2021).

*Primary Examiner* — Briggitte R. Hammond
(74) *Attorney, Agent, or Firm* — Tamika A. Crawl-Bey

(57) ABSTRACT

Various configurations of compressible electrical assemblies are disclosed herein. Each variation of the compressible electrical assemblies includes at least one dielectric, an inner conductor and an outer conductor. Each inner and outer conductor may be configured as a compressible contact. One embodiment of a compressible electrical assembly includes an inner compressible contact, and outer compressible contact and a dielectric disposed at least partially between the inner compressible contact and the outer compressible contact. Each compressible contact also has a divaricated-cut section with a plurality of cuts defined by at least one cut angle measured between a pair of opposing inner surfaces.

19 Claims, 22 Drawing Sheets

(51) Int. Cl.

| | |
|---|---|
| ***H01R 12/58*** | (2011.01) |
| ***H01R 103/00*** | (2006.01) |

(56) References Cited

U.S. PATENT DOCUMENTS

| | | | | |
|---|---|---|---|---|
| 4,941,846 | A | 7/1990 | Guimond et al. | |
| 5,062,619 | A | 11/1991 | Sato | |
| 5,189,364 | A | 2/1993 | Kazama | |
| 5,435,745 | A | 7/1995 | Booth | |
| D404,363 | S | 1/1999 | Pyle | |
| 5,982,187 | A | 11/1999 | Tarzwell | |
| 6,337,142 | B2 | 1/2002 | Harder et al. | |
| D474,740 | S | 5/2003 | Abbott | |
| 6,720,511 | B2 | 4/2004 | Windebank | |
| 7,014,473 | B2 | 3/2006 | Millard et al. | |
| 7,063,565 | B2 | 6/2006 | Ward | |
| 7,070,447 | B1 | 7/2006 | Montena | |
| 7,131,868 | B2 | 11/2006 | Montena | |
| 7,175,112 | B2 | 2/2007 | Uhlmann | |
| 7,377,808 | B2 | 5/2008 | Gentry | |
| 7,455,550 | B1 | 11/2008 | Sykes | |
| 7,491,069 | B1 | 2/2009 | Di Stefano et al. | |
| 7,559,770 | B2 * | 7/2009 | Di Stefano | H01R 12/7082 439/74 |
| 7,563,133 | B2 | 7/2009 | Stein | |
| 7,938,680 | B1 | 5/2011 | Hsieh | |
| 8,323,058 | B2 | 12/2012 | Flaherty et al. | |
| 8,568,163 | B2 | 10/2013 | Burris et al. | |
| 8,597,050 | B2 | 12/2013 | Flaherty et al. | |
| 8,636,529 | B2 | 1/2014 | Stein | |
| 8,690,583 | B2 | 4/2014 | Uesaka et al. | |
| 9,121,507 | B2 | 9/2015 | Ghalambor et al. | |
| 9,147,955 | B2 | 9/2015 | Hanson et al. | |
| 9,435,827 | B2 | 9/2016 | Pak | |
| 9,490,592 | B2 | 11/2016 | Chastain et al. | |
| 9,589,710 | B2 * | 3/2017 | Stein | H01B 17/58 |
| 10,109,965 | B2 | 10/2018 | Taylor et al. | |
| 2002/0013085 | A1 | 1/2002 | Boyle et al. | |
| 2005/0079772 | A1 | 4/2005 | DeLessert | |
| 2007/0194508 | A1 | 8/2007 | Bucciero | |
| 2007/0197099 | A1 | 8/2007 | DiStefano | |
| 2007/0207654 | A1 | 9/2007 | Hu | |
| 2007/0243762 | A1 | 10/2007 | Burke et al. | |
| 2007/0269999 | A1 | 11/2007 | Di Stefano | |
| 2008/0194124 | A1 | 8/2008 | Di Stefano | |
| 2009/0111289 | A1 | 4/2009 | Vinther | |
| 2011/0039448 | A1 | 2/2011 | Stein | |
| 2012/0187971 | A1 | 7/2012 | Huang | |
| 2014/0004721 | A1 | 1/2014 | Stein | |
| 2014/0329421 | A1 | 11/2014 | Schiele et al. | |
| 2015/0276807 | A1 | 10/2015 | Chen et al. | |
| 2017/0054264 | A1 | 2/2017 | Ryu et al. | |
| 2017/0138985 | A1 | 5/2017 | Teranishi et al. | |
| 2017/0222348 | A1 | 8/2017 | Li et al. | |
| 2017/0322235 | A1 | 11/2017 | Liu et al. | |
| 2018/0076552 | A1 | 3/2018 | Wang et al. | |
| 2019/0063537 | A1 | 2/2019 | Dawson et al. | |
| 2019/0074610 | A1 | 3/2019 | Thakare et al. | |
| 2019/0305455 | A1 | 10/2019 | Uppleger | |
| 2020/0203873 | A1 | 6/2020 | Wang et al. | |
| 2021/0035701 | A1 | 2/2021 | Yamamoto | |

FOREIGN PATENT DOCUMENTS

| | | | |
|---|---|---|---|
| CN | 203103590 | U | 7/2013 |
| DE | 3727241 | A1 | 3/1988 |
| DE | 102010008194 | A1 | 8/2011 |
| FR | 2805868 | A1 | 9/2001 |
| GB | 2366605 | A | 3/2002 |
| JP | 08-159195 | A | 6/1996 |
| JP | 2006-153723 | A | 6/2006 |
| JP | 2011-169595 | A | 9/2011 |
| JP | 2016-166783 | A | 9/2016 |
| WO | 2020/112474 | A1 | 6/2020 |

* cited by examiner

COMPRESSIBLE ELECTRICAL ASSEMBLIES WITH DIVARICATED-CUT SECTIONS

CROSS-REFERENCE TO RELATED APPLICATION

This application claims the benefit of priority under 35 U.S.C. § 119 of U.S. Provisional Application Ser. No. 63/119,578, filed Nov. 30, 2020, the content of which is relied upon and incorporated herein by reference in its entirety.

BACKGROUND

The present disclosure generally relates to compressible electrical assemblies, and particularly compressible electrical assemblies, having one or more compressible electric contacts with divaricated-cut sections.

Coaxial transmission mediums for conveying information at microwave frequencies are often characterized by their relatively small size. Their size, however, is not only a consequence of the operation frequency range, but is also particularly attributable to the applications and environments of the systems in which the coaxial transmission mediums are employed. For example, such systems may be found in sophisticated super conductor applications in which the size, density of packaging, and weight of microwave electronic systems must be established as small and light to the extent reasonably possible.

In another specialized configuration for coupling together two coaxial transmission mediums (such as by coupling adjacent modules), the inner conductor mating element of each medium is configured as male, and a double-ended female component (sometimes termed a "bullet") is configured to receive the male mating elements to complete the center conductor connection at the junction. Each female center conductor element of the bullet is typically provided with at least a pair of diametrically opposed longitudinal slots to affect a spring bias (particularly when opposing sides of the element are normally slightly sprung toward one another) for grasping the male center conductor elements of the adjoining modules.

Considering the foregoing, there are still various needs for providing methods of connecting a transmission line ground and a contact, using a tubular housing and center contact, manufactured in such a way as to account for the various tolerances which stack up between printed circuit boards, providing methods of machining housings for high volume application, and providing 20 Ohm interconnects.

SUMMARY

Embodiments disclosed herein are directed to electrical connectors and compressible electrical assemblies or coupling together coaxial transmission media, such as printed circuit boards, and associated methods. Embodiments disclosed herein are particularly suited for applications in which connectors connect coaxial transmission media, which operate or which are operable in the microwave frequency range and similar frequency regimes. These embodiments are also suited for working as a super conductor in cryogenic connector applications and can apply to an array of frequencies as tuned for each individual application. Tubular designs of certain embodiments are further configured such that forces to mate the housing and ground component physical diameters are drastically reduced to accommodate a large number of interconnections between printed circuit boards in a highly dense, or closely spaced arrangement.

Advantages of the concepts disclosed herein include, but are not limited to allowing impendence of the system to be 20 Ohm, providing reduced costs due to efficient manufacturing met, particularly with respect to cutting, weight reduction of the connector assemblies, providing the housings with capability to have a negligible insertion and retention force, and providing for the transmission of very low power RF signals, particularly at cryogenic temperatures.

The compressible electrical assemblies may include a conductive housing, one or more dielectrics, and conductors, some of which may be configured as compressible contacts. Each compressible contact may thus be configured to vary its length, compensate for tolerance ranges/deviations of mating center conductors or cables, and maintain constant electrical/mechanical connection upon assembly. The properties of the compressible contacts disclosed herein are due, in part, to manufacturing the contacts using precision cutting methods, which result in a plurality of cut sections. Such methods include, but are not limited to, laser cutting, electroforming, and/or electro-etching. Regardless of the precision cutting method used, the contacts disclosed herein are preferably designed, using divaricating patterns, such that each contact has a plurality of cut sections in its final form.

The term "divaricated-cut", as used herein, describes an area or section which has been cut in a way that allows a compressible contact to have contact sections configured to form open areas after cutting when in a substantially relaxed state, nest or collapse inwardly to form slots when compressive force is applied to the compressible contact, resulting in a substantially compressed state. The compressible electrical contacts are also configured maintain a flexible and substantially tubular form when transitioning from a substantially relaxed state to a substantially compressed state, despite the presence of the plurality of cut sections.

According to one aspect, a compressible electrical assembly includes an inner compressible contact, having a first inner contact end, a second inner contact end opposing the first inner contact end, and a medial inner portion positioned between the first inner contact end and the second inner contact end; an outer compressible contact, comprising a first outer contact end, a second outer contact end opposing the first outer contact end, and a medial outer portion positioned between the first outer contact end and the second outer contact end; and a dielectric substantially disposed between the medial inner portion and the medial outer portion. In addition, defined in each of the first inner contact end, the second inner contact end, the first outer contact end, and the second outer contact end is a plurality of divaricated cuts.

According to another aspect, a compressible electrical assembly includes an inner compressible contact, having a first inner contact end, a second inner contact end opposing the first inner contact end, and a medial inner portion positioned between the first inner contact end and the second inner contact end; an outer compressible contact, comprising a first outer contact end, a second outer contact end opposing the first outer contact end, and a medial outer portion positioned between the first outer contact end and the second outer contact end; and a dielectric substantially disposed between the medial inner portion and the medial outer portion, and defined in the medial inner portion is a plurality of divaricated cuts.

According to yet another aspect, a connector system includes a housing and at least one compressible electrical assembly disposed in the housing. The at least one compressible electrical assembly includes an inner compressible contact, having a first inner contact end, a second inner contact end opposing the first inner contact end, and a medial inner portion positioned between the first inner contact end and the second inner contact end; an outer compressible contact, comprising a first outer contact end, a second outer contact end opposing the first outer contact end, and a medial outer portion positioned between the first outer contact end and the second outer contact end; and a dielectric substantially disposed between the medial inner portion and the medial outer portion. Moreover, defined in each of the first inner contact end, the second inner contact end, the first outer contact end, and the second outer contact end is a plurality of divaricated cuts. The system additionally includes at least one printed circuit board coupled to the at least one compressible electrical assembly.

Additional aspects of the embodiments disclosed herein will be apparent upon review of the drawings and description, which follow.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and the operation of the various embodiments.

The figures are not necessarily to scale. Like numbers used in the figures may be used to refer to like components. However, it will be understood that the use of a number to refer to a component in a given figure is not intended to limit the component in another figure labeled with the same number.

DETAILED DESCRIPTION

Various exemplary embodiments of the disclosure will now be described with particular reference to the Drawings. Exemplary embodiments of the present disclosure may take on various modifications and alterations without departing from the spirit and scope of the disclosure. Accordingly, it is to be understood that the embodiments of the present disclosure are not limited to the described exemplary embodiments, but are to be controlled by the limitations set forth in the claims and any equivalents thereof.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

Cartesian coordinates are used in some of the Figures for reference and are not intended to be limiting as to direction or orientation.

For purposes of description herein, the terms "upper," "lower," "right," "left," "rear," "front," "vertical," "horizontal," "top," "bottom," "side," and derivatives thereof, shall relate to the disclosure as oriented with respect to the Cartesian coordinates in the corresponding Figure, unless stated otherwise. However, it is to be understood that the disclosure may assume various alternative orientations, except where expressly specified to the contrary.

Figure 1A:
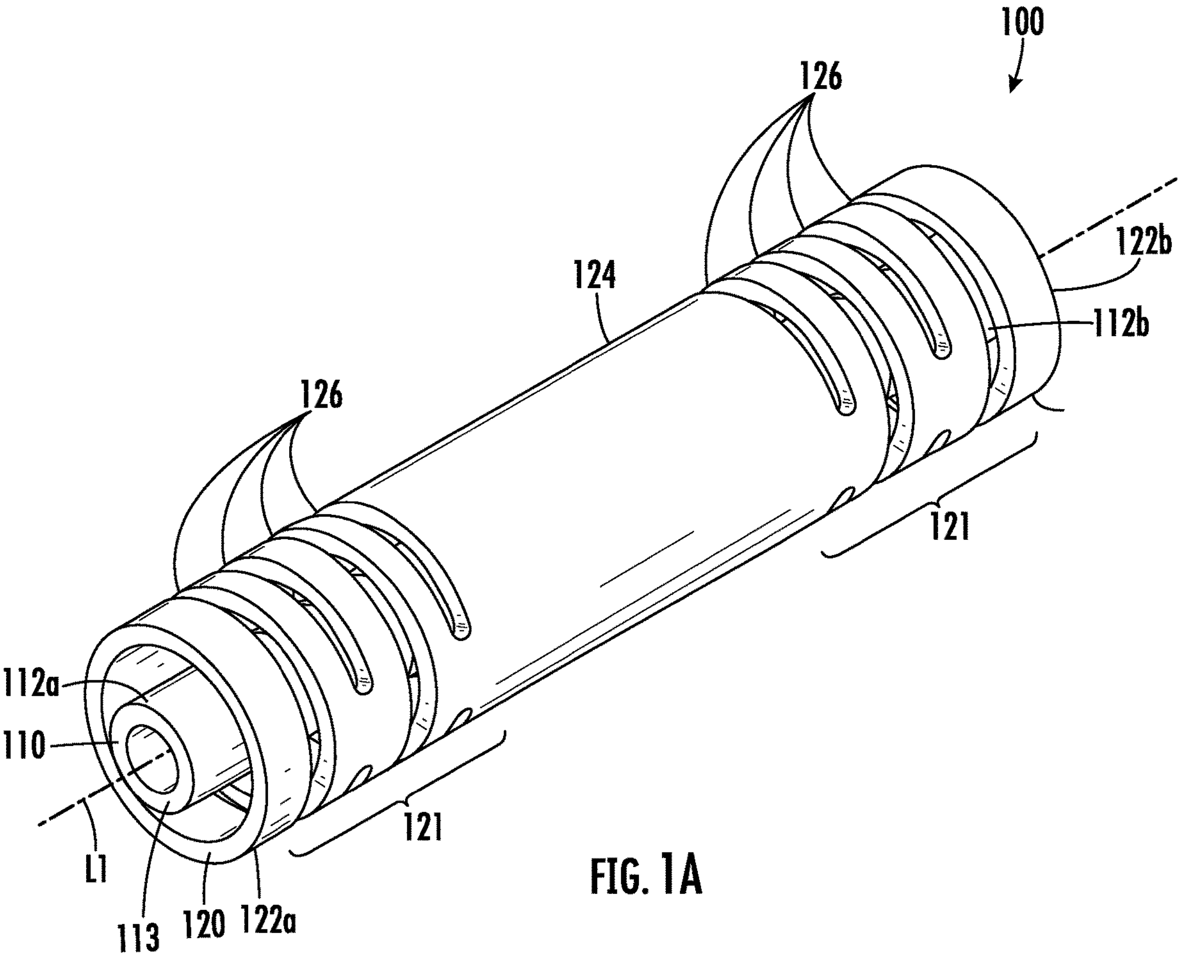
FIG. 1A is an isometric view of a compressible electrical assembly in accordance with embodiments disclosed herein.
Figure 1B:
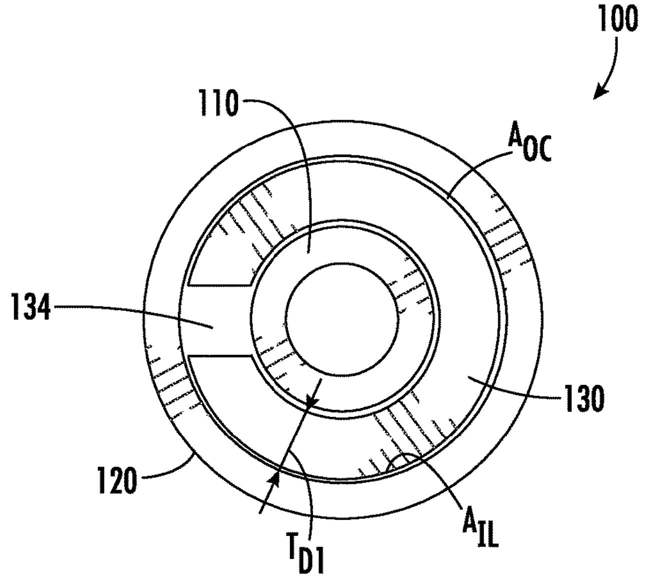
FIG. 1B is a front view of the compressible electrical assembly shown in FIG. 1A.
Figure 1C:
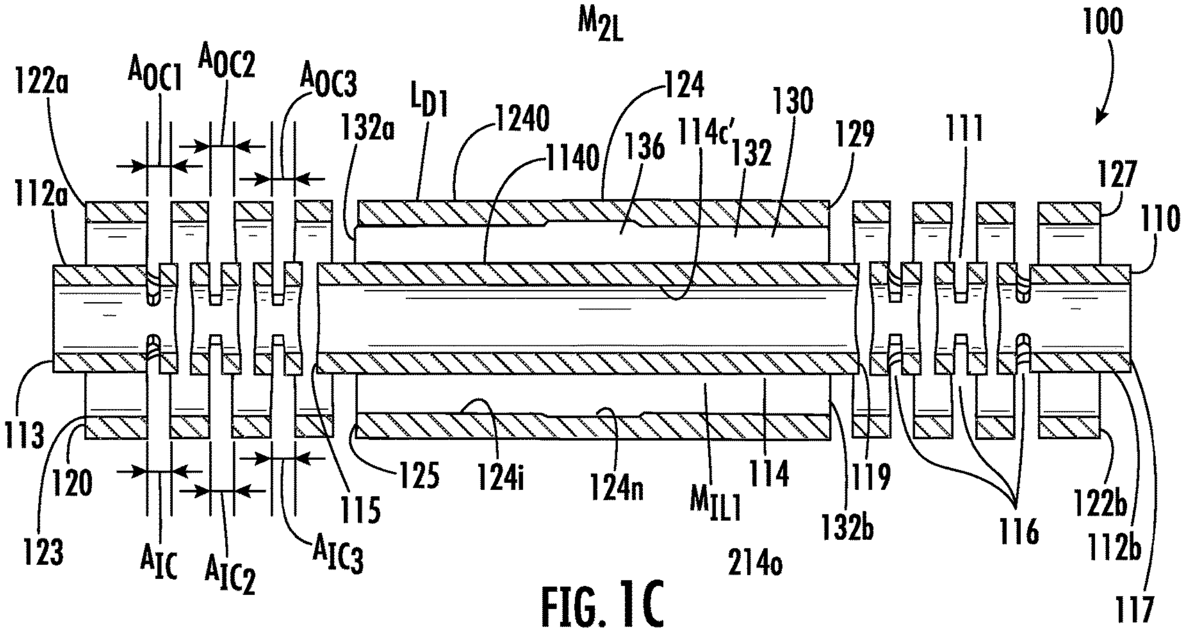
FIG. 1C is a cross-sectional view of the compressible electrical assembly, shown in FIG. 1A.

FIGS. 1A-1C illustrate a compressible electrical assembly 100, including an inner compressible contact 110, an outer compressible contact 120, and a dielectric 130. Both the inner compressible contact 110 and the outer compressible contact 120 are shown in a substantially relaxed state, with the dielectric 130 disposed therebetween. Each element, as shown in the assembly, is shown arranged with respect to a common longitudinal axis L1.

All the compressible electrical contacts disclosed herein are preferably manufactured from tubes using one or more precision cutting methods, e.g. laser cutting. The tube is also preferably manufactured from one or more electrically conductive materials. Suitable materials for the compressible electrical contact include, but are not limited to, brass, copper, beryllium copper and stainless steel. Preferably, these materials have spring-like properties, high strength, high elastic limit, and low moduli.

Overall dimensions for the compressible electrical contacts disclosed herein can range from micro- to large scale. Targeted sizes, however, are on a smaller basis given current industry trends. An exemplary tube size has an inner diameter of about 0.006 inches, an outer diameter of about 0.010 inches, and an overall length of about 0.070 inches. When the compressible electrical contact is manufactured, using a tube having these dimensions, the resulting cut angles range from about 1.5 to about 5 degrees.

Dimensions of the compressible electrical contacts disclosed herein, however, depend on various factors, including but not limited to application requirement, the contact's spring rate and the length of travel between a substantially relaxed state and a compressed state. In some configurations, the compressible electrical contacts can have an effective inner diameter of about 0.006 inches, an effective outer diameter of about 0.010 inches, and an overall length of about 0.070 inches, when manufactured from a tube having an inner diameter of about 0.006 inches, an outer diameter of about 0.010 inches, and an overall length of about 0.070 inches.

In the first embodiment of the compressible electrical assembly 100, the inner compressible contact 110 includes a first inner contact end 112*a*, a second inner contact end 112*b* opposing the inner contact end, and a medial inner portion 114 positioned between the first inner contact end 112*a* and the second inner contact end 112*b*. The first inner contact end 112*a* extends from an outermost face 113 to an inner face 115 of the first inner contact end 112*a*. The second inner contact end 112*b* extends from an outermost face 117 to an inner face 119 of the second inner contact end 112*b*.

Defined in each inner contact end 112*a*, 112*b* is a divaricated-cut section 111, having a plurality of divaricated cuts 116. In this version of the inner compressible contact 110, three divaricated cuts are shown are shown in each contact end. However, additional divaricated cuts may be included, depending on application requirements. Each divaricated cut in the inner compressible contact 110 is defined by at least one cut angle $A_{C1}n$, where n equals the number of divaricated cuts and where the angle is measured from opposing inner surfaces of each respective divaricated cut. In this configuration, three cut are shown $A_{C11}$, $A_{C12}$, $A_{C13}$ are shown. When collapsed, the opposing inner surfaces form a slot.

The medial inner portion 114 is tubular, divaricated-cut free, defined by an inner diameter 114*i* and outer diameter 114*o* and a medial inner portion length, $M_{IL}$, measured between inner faces 115, 119. The medial outer portion 124 also includes a radially disposed notch 124*n*.

The outer compressible contact 120 includes a first outer contact end 122*a*, a second outer contact end 122*b* opposing the outer contact end, and a medial outer portion 124 positioned between the first outer contact end 122*a* and the second outer contact end 122*b*. The first outer contact end 122*a* extends from an outermost face 123 to an inner face 125 of the first outer contact end 122*a*. The second outer contact end 122*b* extends from an outermost face 127 to an inner face 129 of the second outer contact end 122*b*. Notably, the first inner contact end 112*a* and the second inner contact end 112*b* extend beyond the first outer contact end 122*a* and the second outer contact end 122*b*.

Defined in each inner contact end 122*a*, 122*b* is a divaricated-cut section 121, having a plurality of divaricated cuts 126. In this version of the outer compressible contact 120, at least three divaricated cuts are shown are shown in each contact end. However, additional divaricated cuts may be included, depending on application requirements.

Each divaricated cut in the inner compressible contacts disclosed herein can be defined by at least one cut angle $A_{CO}n$, where n equals the number of divaricated cuts and where the angle is measured from opposing inner surfaces of each respective divaricated cut. In this compressible contact configuration, three cuts $A_{CO1}$, $A_{CO2}$, $A_{CO3}$ are shown.

The medial inner portion 124 is tubular, divaricated-cut free, defined by an inner diameter 124*i* and outer diameter 124*o* and a medial inner portion length, $M_{OL}$, measured between inner faces 125, 129. The medial outer portion 124 also includes a radially disposed notch 124*n*.

In the compressible electrical assembly 100, the dielectric 130 is positioned between the inner compressible contact 110 and the outer compressible contact 120, as shown particularly in FIGS. 1B and 1C. The dielectric 130 has a dielectric body 132, with a first body end 132*a* and a second body end 132*b* opposing the first body end 132*a*. Defined in this configuration of the dielectric is a channel 134. Preferably, the channel 134 extends fully along the length LD1 of the dielectric 130. The dielectric 130 is further defined by an inner arc length $A_{IL}$, an outer arc length $A_{IL}$, and a dielectric thickness $T_{D1}$. In addition, the dielectric has a centrally located upwardly extending portion 136 that fits within notch 124*n*.

Figure 1D:
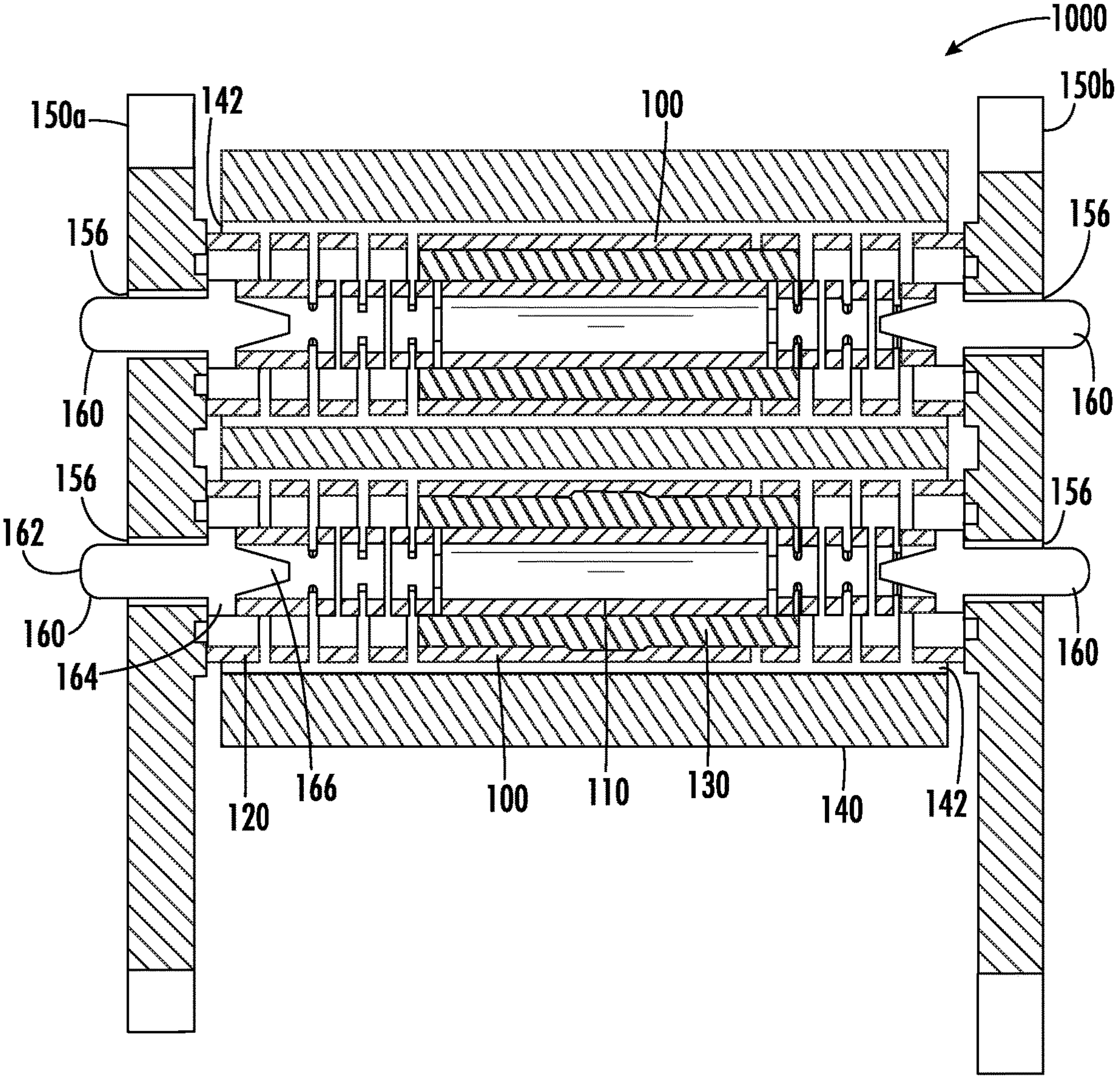
FIG. 1D is a cross-sectional view of a system, including two compressible electrical assemblies, assembled with a housing, center contacts, a printed circuit boards.

FIG. 1D shows an exemplary connector system 1000, which includes two compressible electrical assemblies 100, a housing 140, printed circuit boards 150*a*, 150*b*, and contacts 160*a*, 160*b*.

The housing 140 helps to align the respective compressible electrical assembly 100 for signal transmission. Defined in the housing 140 are two thru-holes 142. Each thru-hole 142 is configured to house the compressible electrical assembly 100, including the inner compressible contact 110, the outer compressible contact 120, and the dielectric 130. This configuration of the housing 140 may also be suited for other compressible electrical assembly configurations, which will be further described herein.

Each printed circuit board 150*a*, 150*b* includes a base 152 and a plurality of engagement elements 154 that couple with the compressible electrical assembly 100. Also each printed circuit board has at least two apertures 156 for positioning of contacts therein.

Each contact 160 has a male configuration and is soldered or otherwise attached to the printed circuit boards. Each contact 160*a*, 160*b* preferably includes a rounded portion 162, a medial portion 164, and a tapered portion 166. The overall contact configuration ensures concentricity within the connector system and alignment with the printed circuit boards 150*a*, 150*b* and the compressible electrical assembly 100. Each rounded portion 162 is configured for positioning in apertures 156.

Figure 2A:
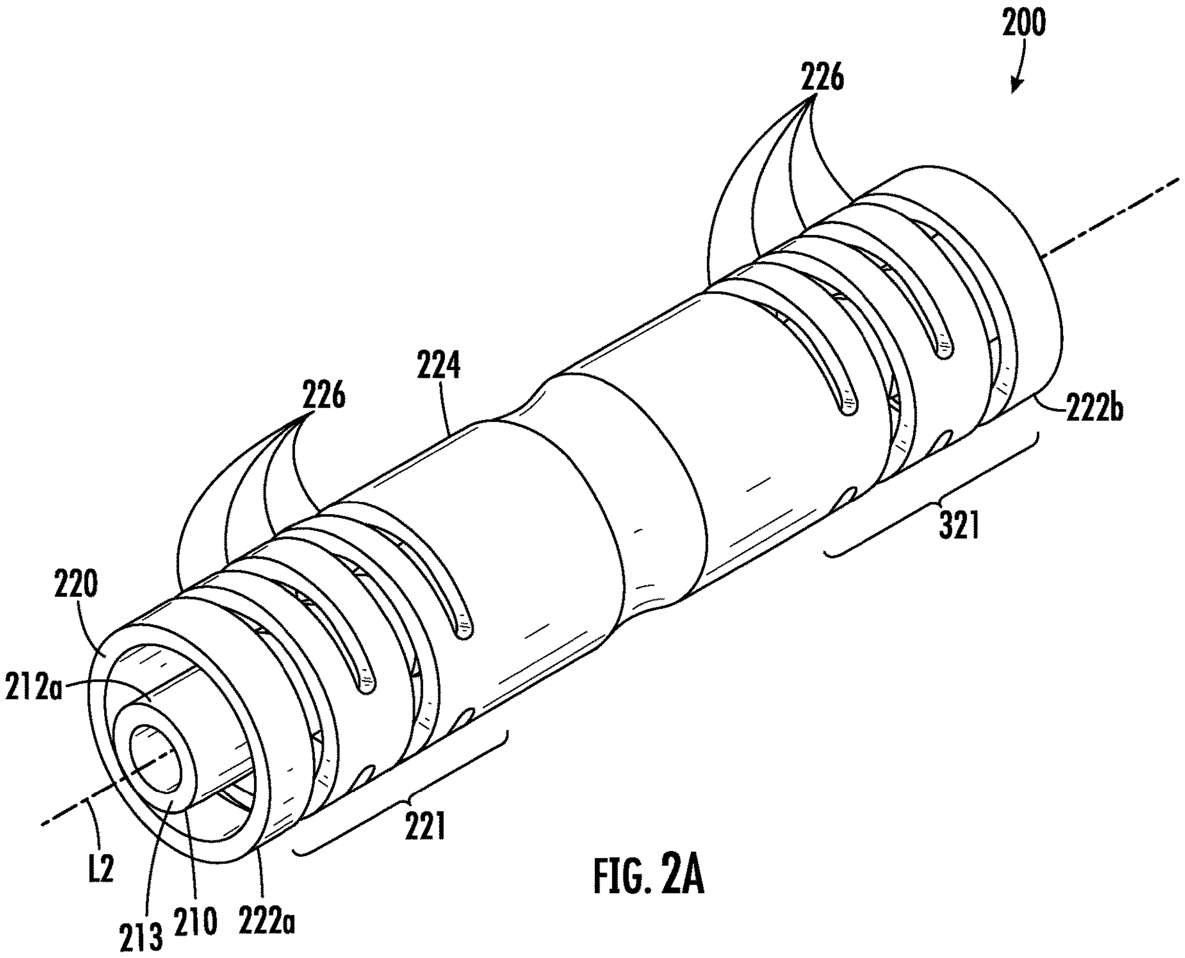
FIG. 2A is an isometric view of another compressible electrical assembly in accordance with embodiments disclosed herein.
Figure 2B:
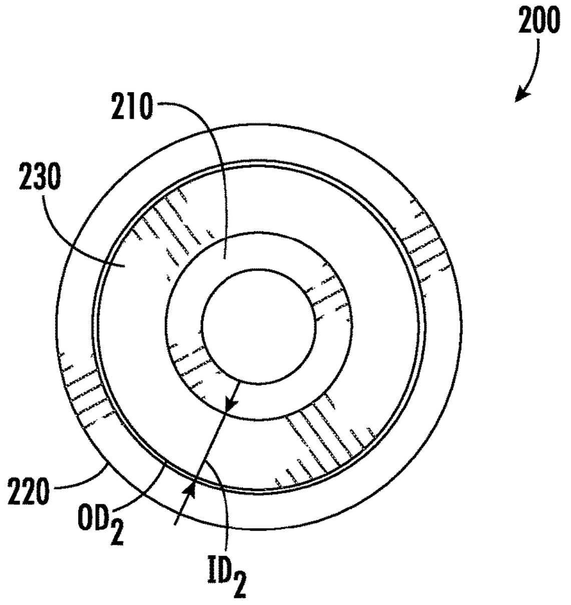
FIG. 2B is a front view of the compressible electrical assembly shown in FIG. 2A.
Figure 2C:
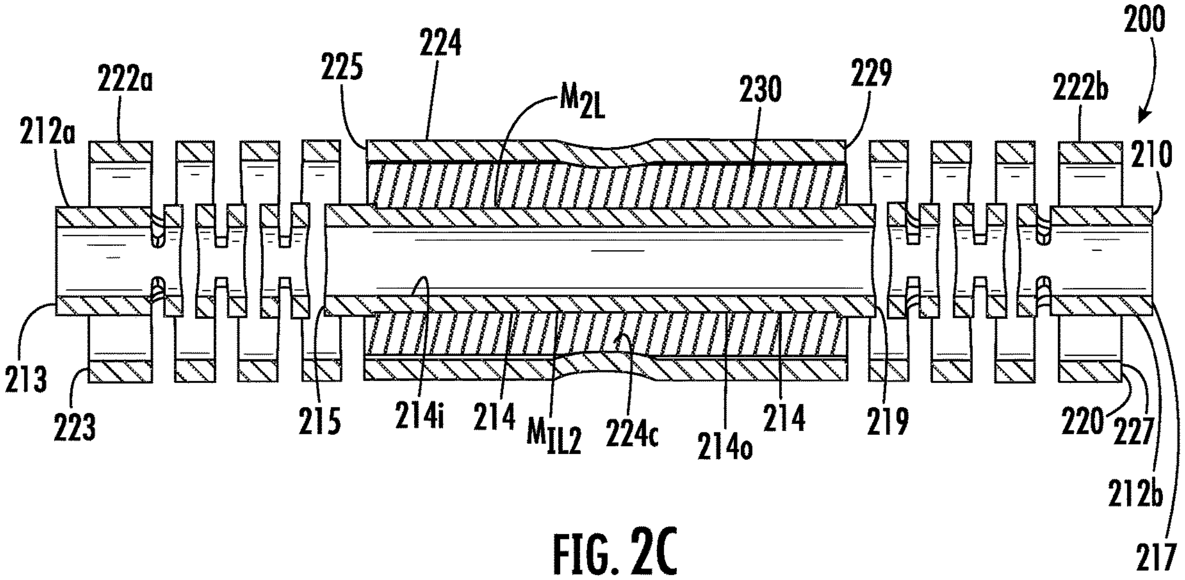
FIG. 2C is a cross-sectional view of the compressible electrical assembly shown in FIG. 2A.

FIGS. 2A-2C illustrate another compressible electrical assembly 200, including an inner compressible contact 210, an outer compressible contact 220, and a dielectric 230. Both the inner compressible contact 210 and the outer compressible contact 220 are shown in a substantially relaxed state, with the dielectric 230 disposed therebetween. Each element, as shown in the assembly, is shown arranged with respect to a common longitudinal axis L2.

The inner compressible contact 210 includes a first inner contact end 212*a*, a second inner contact end 212*b* opposing the inner contact end, and a medial inner portion 214 positioned between the first inner contact end 212*a* and the second inner contact end 212*b*. The first inner contact end 212*a* extends from an outermost face 213 to an inner face 215 of the first inner contact end 212*a*. The second inner contact end 212*b* extends from an outermost face 217 to an inner face 219 of the second inner contact end 212*b*. The medial inner portion 214 includes a radially disposed crimped area 218 centrally positioned along the length of the medial outer portion 214.

Defined in each inner contact end 212*a*, 212*b* is a divaricated cut section 211 having a plurality of divaricated cuts 216. In this version of the inner compressible contact 210, at least three divaricated cuts are shown are shown in each contact end. However, additional divaricated cuts may be included, depending on application requirements.

The medial inner portion 214 is tubular, divaricated-cut free, defined by an inner diameter 214*i* and outer diameter 114*o* and a medial inner portion length, $M_{2L}$, measured between inner faces 215, 219. The medial outer portion 224 also conforms to the radially disposed crimp area 218 to form a crimped portion 224*c*.

The outer compressible contact 220 includes a first inner contact end 222*a*, a second inner contact end 222*b* opposing the inner contact end, and a medial outer portion 224 positioned between the first outer contact end 222*a* and the second outer contact end 222*b*. The first outer contact end 222*a* extends from an outermost face 223 to an inner face 225 of the first inner contact end 222*a*. The second inner contact end 222*b* extends from an outermost face 227 to an inner face 229 of the second outer contact end 222*b*.

Defined in each inner contact end 222*a*, 222*b* is a plurality of divaricated cuts 226. In this version of the outer compressible contact 220, three divaricated cuts are shown are shown in each contact end. However, additional divaricated cuts may be included, depending on application requirements. Each divaricated cut in the inner compressible contact 220 is defined by at least one cut angle $A_{CO}$n, where n equals the number of divaricated cuts and where the angle is measured from opposing inner surfaces of each respective divaricated cut. In this configuration, three cut are shown $A_{CO1}$, $A_{CO2}$, $A_{CO3}$ are shown.

The medial inner portion 224 is tubular, divaricated-cut free, defined by an inner diameter 224*i* and outer diameter 224*o* and a medial inner portion length, $M_{OL}$, measured between inner faces 225, 229. The medial outer portion 224 also includes a radially disposed notch 224*n*.

In the compressible electrical assembly 200, the dielectric 230 is positioned between the inner compressible contact 210 and the outer compressible contact 220, as shown particularly in FIGS. 2B and 2C. The dielectric 230 has a dielectric body 232, with a first body end 232*a* and a second body end 232*b* opposing the first body end 232*a*. The dielectric 130 is further defined by an inner diameter $ID_2$ an outer diameter $OD_2$, and a dielectric thickness $T_{D2}$.

Figure 3A:
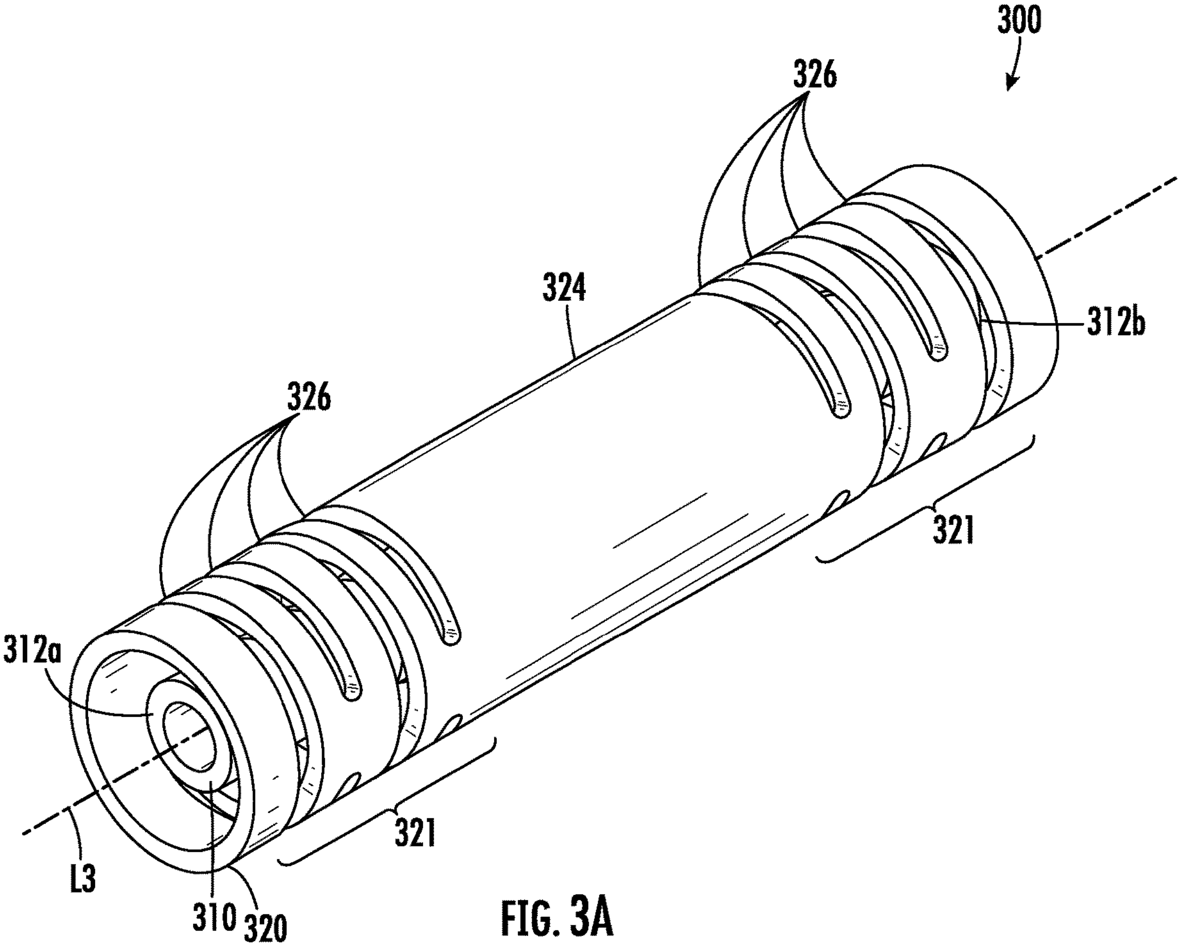
FIG. 3A is an isometric view of another compressible electrical assembly in accordance with embodiments disclosed herein.
Figure 3B:
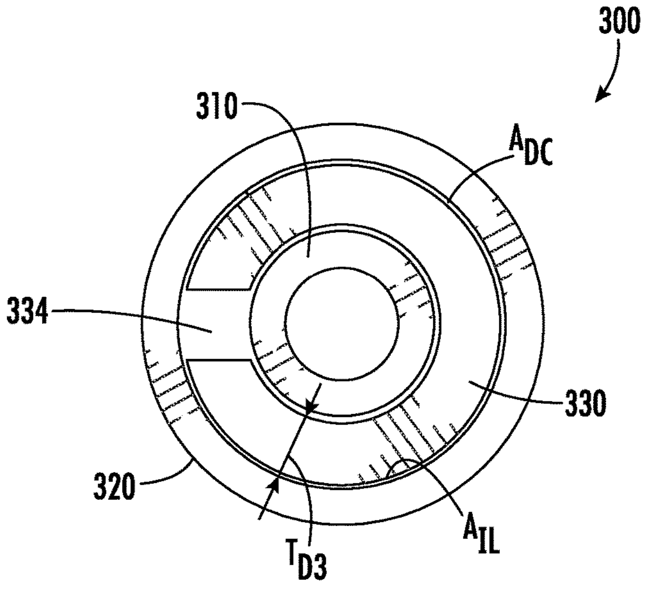
FIG. 3B is a front view of the compressible electrical assembly shown in FIG. 3A.
Figure 3C:
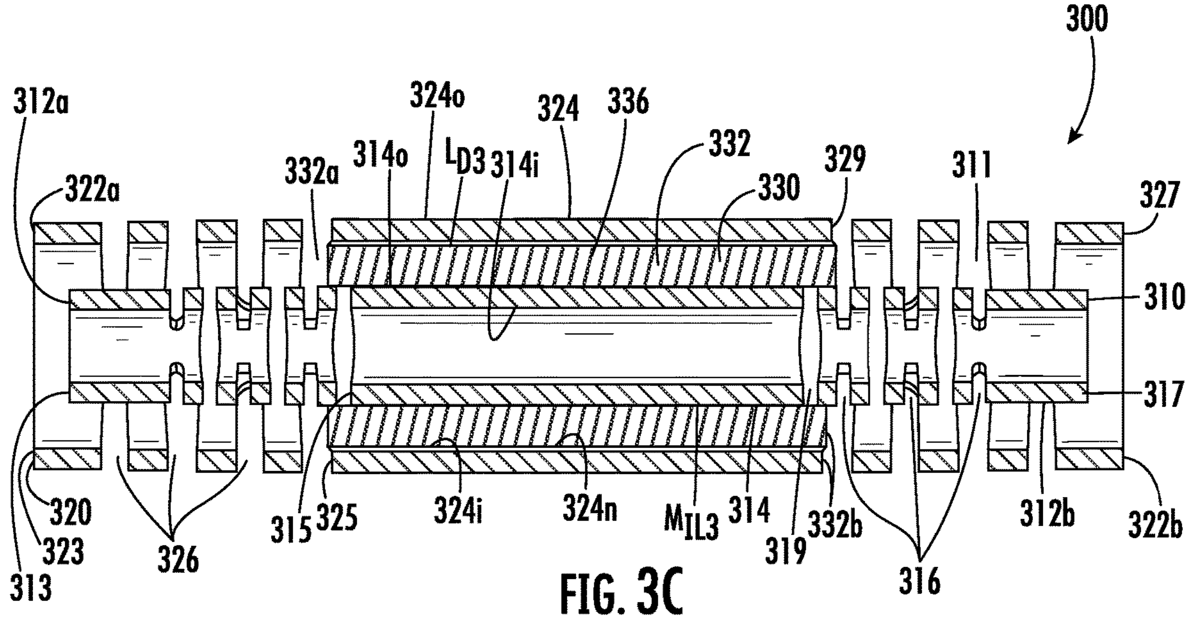
FIG. 3C is a cross-sectional view of the compressible electrical assembly shown in FIG. 3A.

FIGS. 3A-3C illustrate another embodiment of a compressible electrical assembly 300, including an inner compressible contact 310, an outer compressible contact 320, and a dielectric 330. Both the inner compressible contact 310 and the outer compressible contact 320 are shown in a substantially relaxed state, with the dielectric 330 disposed therebetween. Each element, as shown in the assembly, is shown arranged with respect to a common longitudinal axis L3.

In this embodiment of the compressible electrical assembly 300, the inner compressible contact 310 includes a first inner contact end 312*a*, a second inner contact end 312*b* opposing the inner contact end, and a medial inner portion 314 positioned between the first inner contact end 312*a* and the second inner contact end 312*b*. The first inner contact end 312*a* extends from an outermost face 313 to an inner face 315 of the first inner contact end 312*a*. The second inner contact end 312*b* extends from an outermost face 317 to an inner face 319 of the second inner contact end 312*b*.

Defined in each inner contact end 312*a*, 312*b* is a divaricated-cut section 311, having a plurality of divaricated cuts 316. In this version of the inner compressible contact 310, three divaricated cuts are shown are shown in each contact end. However, additional divaricated cuts may be included, depending on application requirements. Each divaricated cut in the inner compressible contact 310 is defined by at least one cut angle $A_{C1}$n, where n equals the number of divaricated cuts and where the angle is measured from opposing inner surfaces of each respective divaricated cut. In this configuration, three cut are shown $A_{C13}$, $A_{C12}$, $A_{C13}$ are shown.

The medial inner portion 314 is tubular, divaricated-cut free, defined by an inner diameter 314*i* and outer diameter 314*o* and a medial inner portion length, $M_{IL}$, measured between inner faces 315, 319. The medial outer portion 324 also includes a radially disposed notch 324*n*.

The outer compressible contact 320 includes a first outer contact end 322*a*, a second outer contact end 322*b* opposing the outer contact end, and a medial outer portion 324 positioned between the first outer contact end 322*a* and the second outer contact end 322*b*. The first outer contact end 322*a* extends from an outermost face 323 to an inner face 325 of the first outer contact end 322*a*. The second outer contact end 322*b* extends from an outermost face 327 to an inner face 329 of the second outer contact end 322*b*. Notably, the first outer contact end 322*a* and the second outer contact end 322*b* extend beyond the first outer contact end 312*a* and the second outer contact end 312*b*.

Defined in each inner contact end 322*a*, 322*b* is a divaricated-cut section 321, having a plurality of divaricated cuts 326. In this version of the outer compressible contact 320, at least three divaricated cuts are shown are shown in each contact end. However, additional divaricated cuts may be included, depending on application requirements.

The medial inner portion 324 is tubular, divaricated-cut free, defined by an inner diameter 324*i* and outer diameter 324*o* and a medial inner portion length, $M_{OL}$, measured between inner faces 325, 329. The medial outer portion 324 also includes a radially disposed notch 324*n*.

In the compressible electrical assembly 300, the dielectric 330 is positioned between the inner compressible contact 310 and the outer compressible contact 320, as shown particularly in FIGS. 3B and 3C. The dielectric 330 has a dielectric body 332, with a first body end 332*a* and a second body end 332*b* opposing the first body end 332*a*. Defined in this configuration of the dielectric is a channel 334. Preferably, the channel 334 extends fully along the length LD3 of the dielectric 330. The dielectric 330 is further defined by an inner arc length $A_{IL}$, an outer arc length $A_{IL}$, and a dielectric thickness $T_{D3}$. In addition, the dielectric has a centrally located upwardly extending portion 336 that fits within notch 324*n*.

Figure 4A:
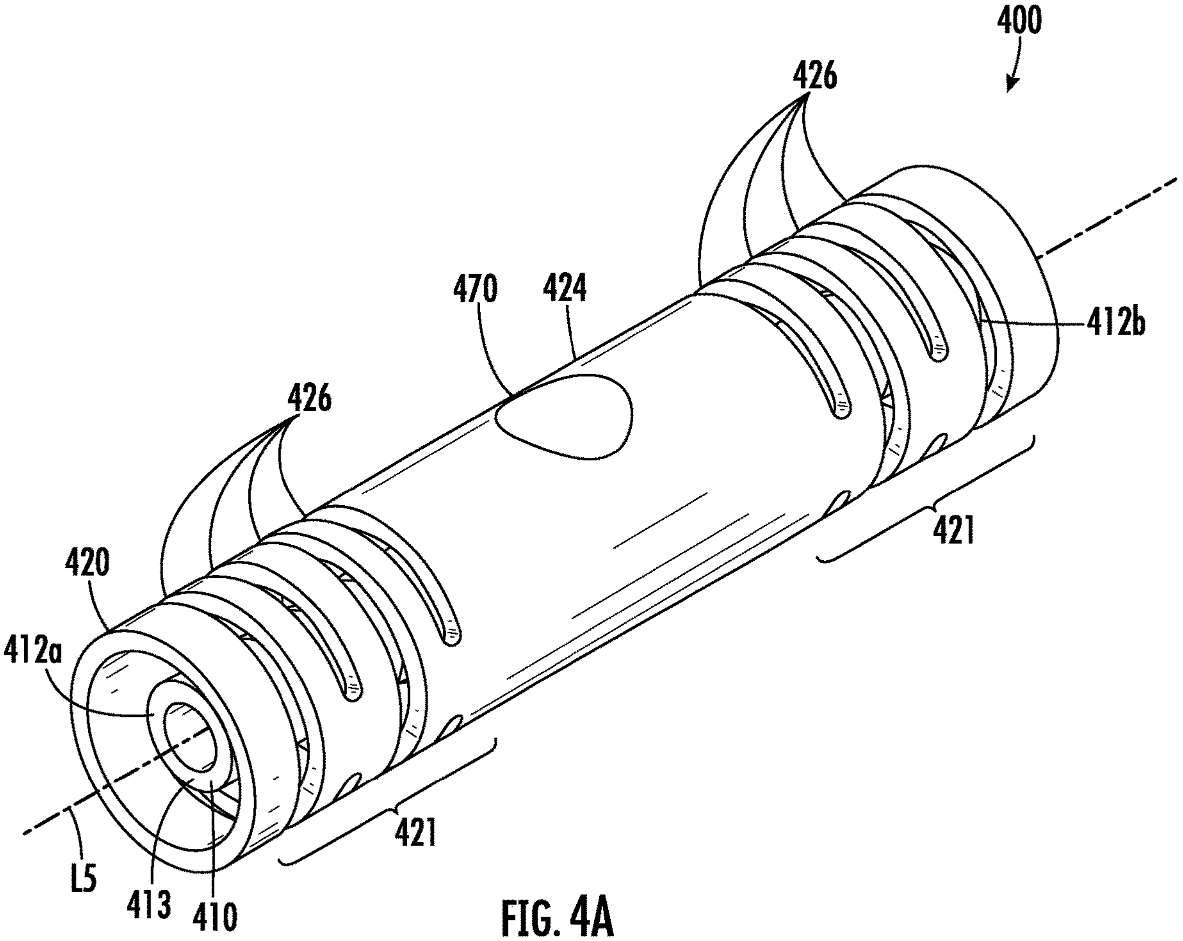
FIG. 4A is an isometric view of another compressible electrical assembly in accordance with embodiments disclosed herein.
Figure 4B:
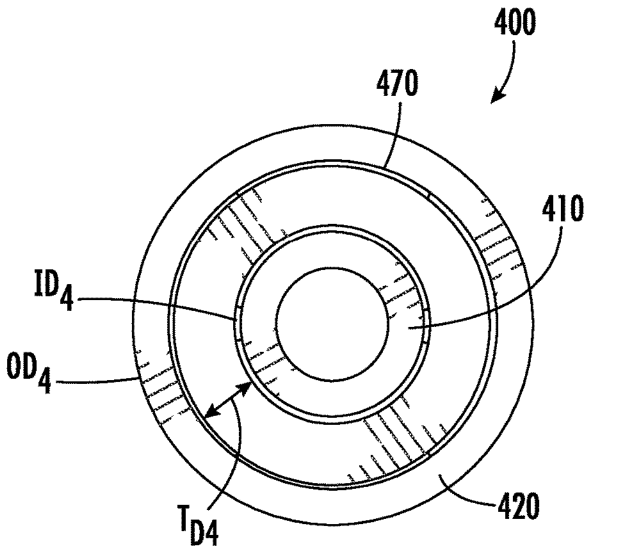
FIG. 4B is a front view of the compressible electrical assembly shown in FIG. 4A.
Figure 4C:
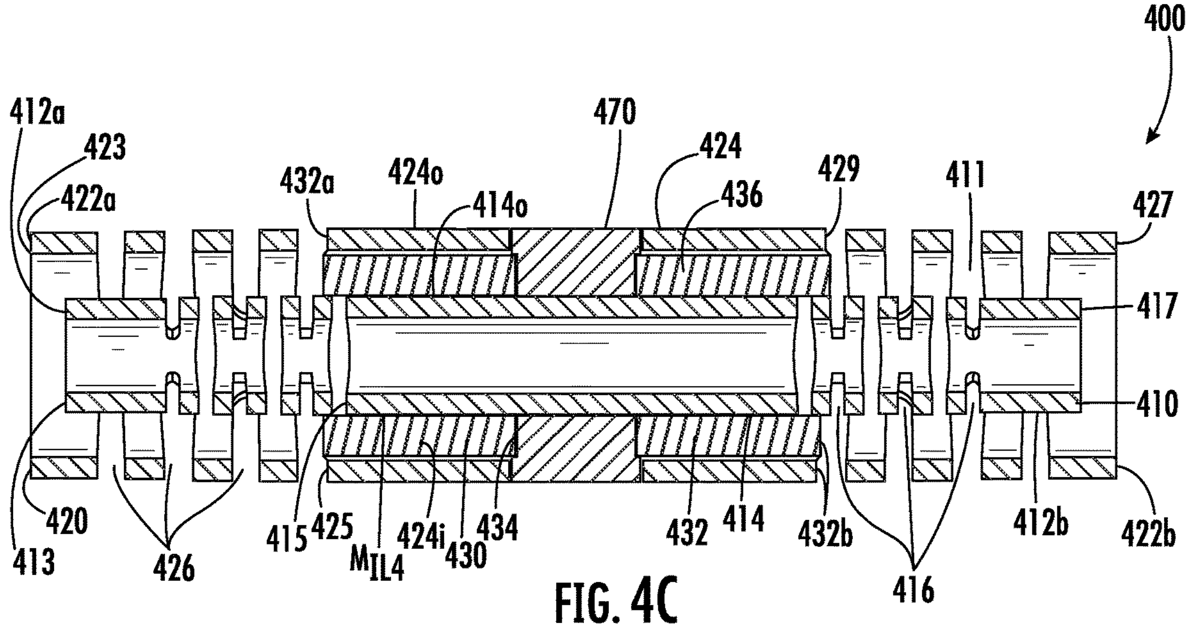
FIG. 4C is a cross-sectional view of the compressible electrical assembly shown in FIG. 4A.

FIGS. 4A-4C illustrate another embodiment of a compressible electrical assembly 400, including an inner compressible contact 410, an outer compressible contact 420, and a dielectric 430. Both the inner compressible contact 410 and the outer compressible contact 420 are shown in a substantially relaxed state, with the dielectric 430 disposed therebetween. Each element, as shown in the assembly, is shown arranged with respect to a common longitudinal axis L4.

Referring particularly to FIG. 4C, in this embodiment of the compressible electrical assembly 400, the inner compressible contact 410 includes a first inner contact end 412*a*, a second inner contact end 412*b* opposing the inner contact end, and a medial inner portion 414 positioned between the first inner contact end 412*a* and the second inner contact end 412*b*. The first inner contact end 412*a* extends from an outermost face 413 to an inner face 415 of the first inner contact end 412*a*. The second inner contact end 412*b* extends from an outermost face 417 to an inner face 419 of the second inner contact end 412*b*.

Defined in each inner contact end 412*a*, 412*b* is a divaricated-cut section 411, having a plurality of divaricated cuts 416. In this version of the inner compressible contact 410, three divaricated cuts are shown are shown in each contact end. However, additional divaricated cuts may be included, depending on application requirements. Each divaricated cut in the inner compressible contact 410 is defined by at least one cut angle $A_{C1}n$, where n equals the number of divaricated cuts and where the angle is measured from opposing inner surfaces of each respective divaricated cut.

The medial inner portion 414 is tubular, divaricated-cut free, defined by an inner diameter 414*i* and outer diameter 414*o* and a medial inner portion length, $M_{IL}$, measured between inner faces 415, 419. The medial outer portion 424 also includes a radially and centrally positioned opening 470. Disposed within the opening 470 is a retaining element 480, which is preferably curable and configured to retain the center contact and dielectric in the assembly 400. The retaining element 470 may be an adhesive, an epoxy-based material or the like, which can be used for retention purposes.

The outer compressible contact 420 includes a first outer contact end 422*a*, a second outer contact end 422*b* opposing the outer contact end, and a medial outer portion 424 positioned between the first outer contact end 422*a* and the second outer contact end 422*b*. The first outer contact end 422*a* extends from an outermost face 423 to an inner face 425 of the first outer contact end 422*a*. The second outer contact end 422*b* extends from an outermost face 427 to an inner face 429 of the second outer contact end 422*b*. Notably, the first outer contact end 422*a* and the second outer contact end 422*b* extend beyond the first inner contact end 412*a* and the second inner contact end 412*b*.

Defined in each inner contact end 422*a*, 422*b* is a divaricated-cut section 421, having a plurality of divaricated cuts 426. In this version of the outer compressible contact 420, at least three divaricated cuts are shown are shown in each contact end. However, additional divaricated cuts may be included, depending on application requirements.

The medial inner portion 424 is tubular, divaricated-cut free, defined by an inner diameter 424*i* and outer diameter 424*o* and a medial inner portion length, $M_{OL}$, measured between inner faces 425, 429. The medial outer portion 424 also includes a radially disposed notch 424*n*.

In the compressible electrical assembly 400, the dielectric 430 is positioned between the inner compressible contact 410 and the outer compressible contact 420, as shown particularly in FIGS. 4B and 4C. The dielectric 430 has a dielectric body 432, with a first body end 432*a* and a second body end 432*b* opposing the first body end 432*a*. Defined in this configuration of the dielectric is a channel 434. Preferably, the channel 434 extends fully through the dielectric 430, as shown in FIG. 4C. The dielectric 130 is further defined by an inner diameter $ID_4$ an outer diameter $OD_4$, and a dielectric thickness $T_{D4}$.

Figure 5A:
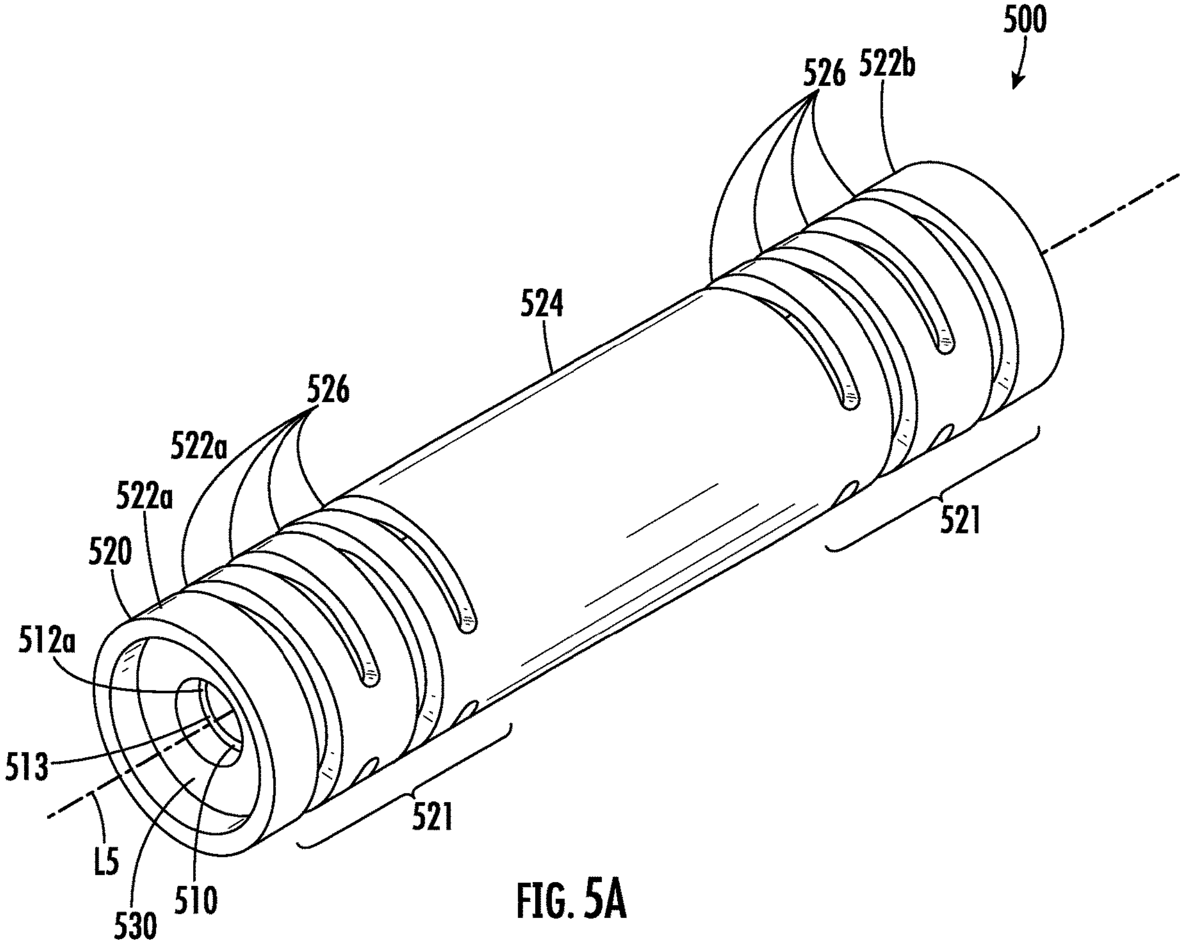
FIG. 5A is an isometric view of another compressible electrical assembly in accordance with embodiments disclosed herein.
Figure 5B:
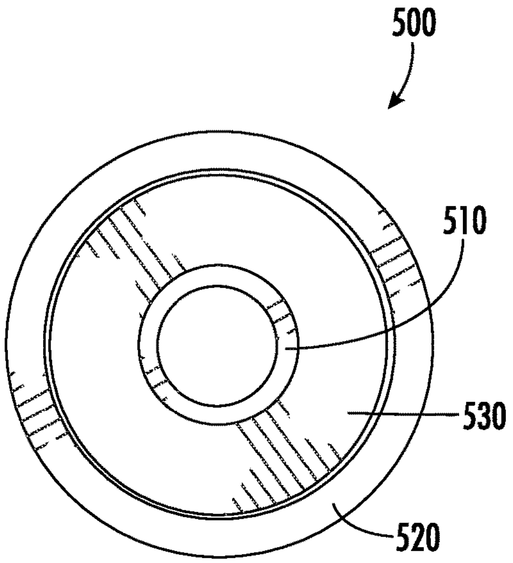
FIG. 5B is a front view of the compressible electrical assembly shown in FIG. 5A.
Figure 5C:
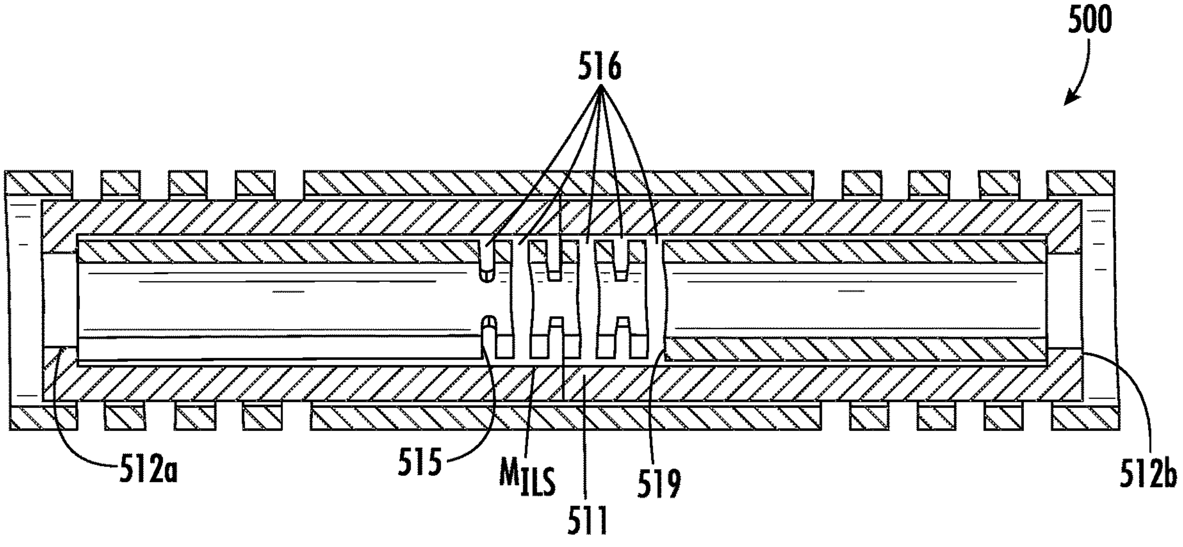
FIG. 5C is a cross-sectional view of the compressible electrical assembly, shown in FIG. 5A.

FIGS. 5A-5C illustrate another embodiment of a compressible electrical assembly 500, including an inner compressible contact 510, an outer compressible contact 520, and a dielectric 530. Both the inner compressible contact 510 and the outer compressible contact 520 are shown in a substantially relaxed state, with the dielectric 530 disposed therebetween. Each element, as shown in the assembly, is shown arranged with respect to a common longitudinal axis L5.

Referring particularly to FIG. 5C, in this embodiment of the compressible electrical assembly 500, the inner compressible contact 510 includes a first inner contact end 512*a*, a second inner contact end 512*b* opposing the inner contact end, and a medial inner portion 514 positioned between the first inner contact end 512*a* and the second inner contact end 512*b*. The first inner contact end 512*a* extends from an outermost face 513 to an inner face 515 of the first inner contact end 512*a*. The second inner contact end 512*b* extends from an outermost face 517 to an inner face 519 of the second inner contact end 512*b*.

Defined in each inner contact end 512*a*, 512*b* is a divaricated-cut section 511, having a plurality of divaricated cuts 516. In this version of the inner compressible contact 510, three divaricated cuts are shown are shown in each contact end. However, additional divaricated cuts may be included, depending on application requirements. Each divaricated cut in the inner compressible contact 510 is defined by at least one cut angle $A_{C1}n$, where n equals the number of divaricated cuts and where the angle is measured from opposing inner surfaces of each respective divaricated cut.

The medial inner portion 514 includes a divaricated cut section 511 with a plurality of divaricated cuts 516 and is also a medial inner portion length, $M_{IL5}$, measured between inner faces 515, 519.

The outer compressible contact 520 includes a first outer contact end 522*a*, a second outer contact end 522*b* opposing the outer contact end, and a medial outer portion 524 positioned between the first outer contact end 522*a* and the second outer contact end 522*b*. The first outer contact end 522*a* extends from an outermost face 523 to an inner face 525 of the first outer contact end 522*a*. The second outer contact end 522*b* extends from an outermost face 527 to an inner face 529 of the second outer contact end 522*b*. Notably, the first outer contact end 522*a* and the second outer contact end 522*b* extend beyond the first inner contact end 512*a* and the second inner contact end 512*b*.

Defined in each inner contact end 522*a*, 522*b* is a divaricated-cut section 521, having a plurality of divaricated cuts 526. In this version of the outer compressible contact 520, at least three divaricated cuts are shown are shown in each contact end. However, additional divaricated cuts may be included, depending on application requirements.

The medial inner portion 524 is tubular, divaricated-cut free, defined by an inner diameter 524*i* and outer diameter 524*o* and a medial inner portion length, $M_{OL}$, measured between inner faces 525, 529.

In the compressible electrical assembly 500, the dielectric 530 is positioned between the inner compressible contact 510 and the outer compressible contact 520, as shown particularly in FIGS. 5B and 5C. The dielectric 530 has a dielectric body 532, with a first body end 532*a* and a second body end 532*b* opposing the first body end 532*a*. Defined in this configuration of the dielectric is a channel 534. Preferably, the channel 534 extends fully through the dielectric 530, as shown in FIG. 5C. The dielectric 130 is further defined by an inner diameter $ID_5$ an outer diameter $OD_5$, and a dielectric thickness $T_{D5}$.

Figure 5D:
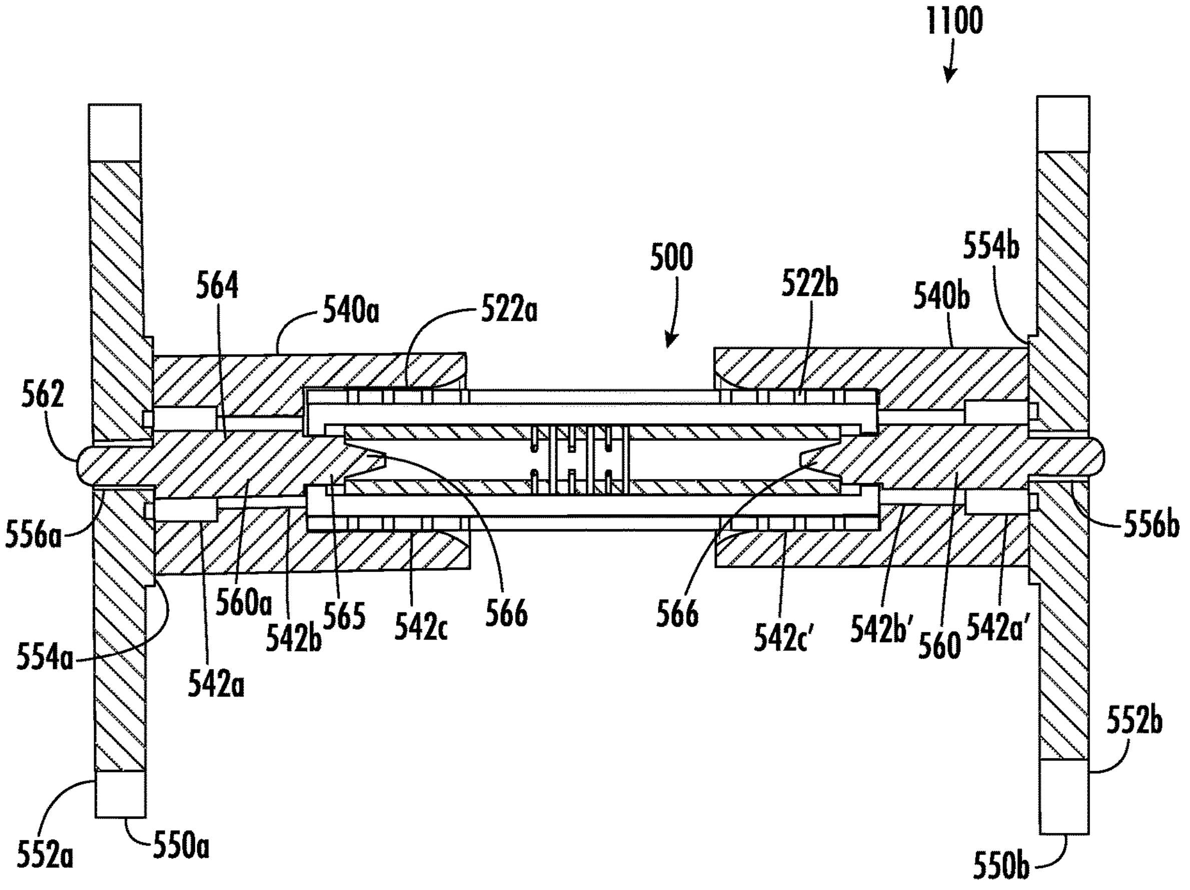
FIG. 5D is a cross-sectional view a connector system, including printed circuit boards, center contacts, housings, and the compressible electrical assembly shown in FIGS. 5A-5C.
Figure 9A:
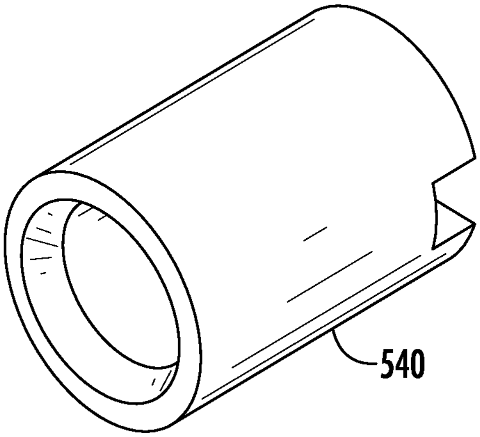
FIG. 9A is an isometric view of a housing and center contact assembly in accordance with embodiments disclosed herein.
Figure 9B:
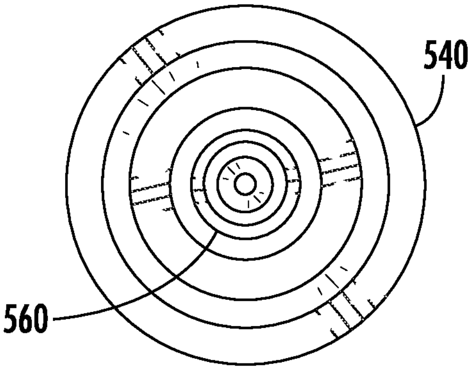
FIG. 9B is a front view of the housing and center contact assembly, shown in FIG. 9A.
Figure 9C:
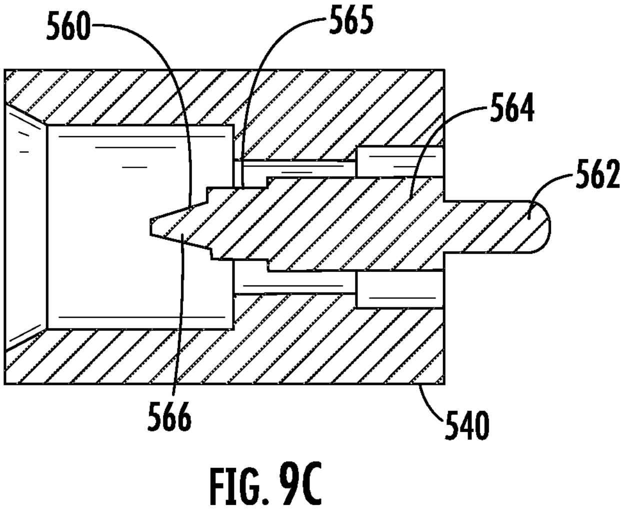
FIG. 9C is a cross-sectional view of the housing and center contact assembly shown in FIG. 9A.

FIG. 5D shows an exemplary connector system 1100, which includes the compressible electrical assembly 500, housings 540*a*, 540*b*, printed circuit boards 550*a*, 550*b*, and contacts 560*a*, 560*b*. FIGS. 9A-9C show additional views of the housings 540 assembled with contacts 560.

Each housing 540*a*, 540*b* helps to align the compressible electrical assembly 500 for signal transmission. Defined in the housing 540 are bores 542*a*, 542*b*, 542*c*, 542*a*', 542*b*', 542*c*'. Bores 542*c*, 542*c*' also have chamfers 543, 543' that facilitate insertion of the contact ends 522*a*, 522*b* into the housings.

Each printed circuit board 550*a*, 550*b* includes a base 552*a*, 552*b* and an engagement element 554*a*, 554*b* that couple with the compressible electrical assembly 500. Also each printed circuit board has at least one aperture 556*a*, 556*b* for positioning of contacts therein.

Each contact 560 has a male configuration and is soldered or otherwise attached to the printed circuit boards. Each contact 560*a*, 560*b* preferably includes a rounded portion 562, medial contact portions 564, 565, and a tapered portion 566. The overall contact configuration ensures concentricity within the connector system and alignment with the printed circuit boards 550*a*, 550*b* and the compressible electrical assembly 500. Each rounded portion 562 is configured for positioning in apertures 556*a*, 556*b*.

Figure 6A:
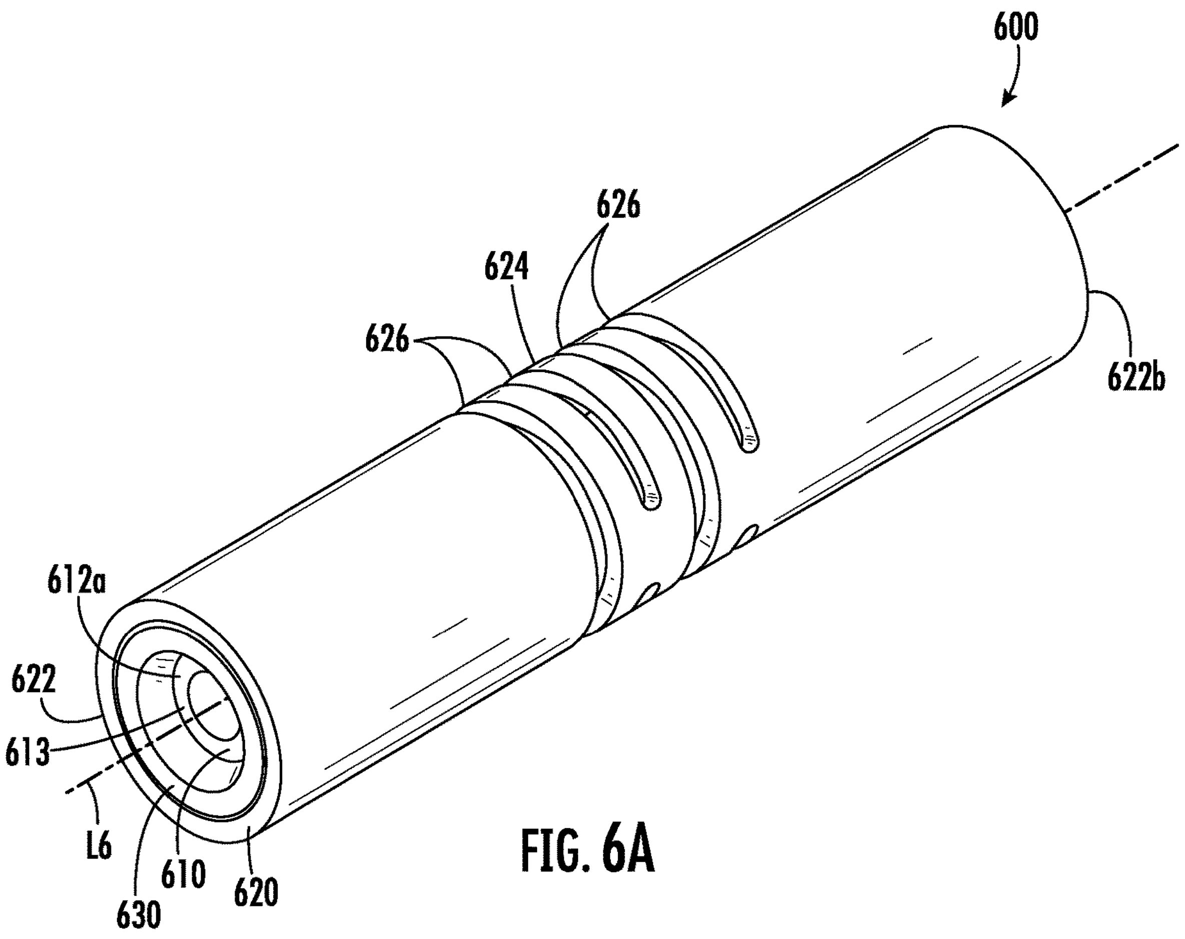
FIG. 6A is an isometric view of another compressible electrical assembly in accordance with embodiments disclosed herein
Figure 6B:
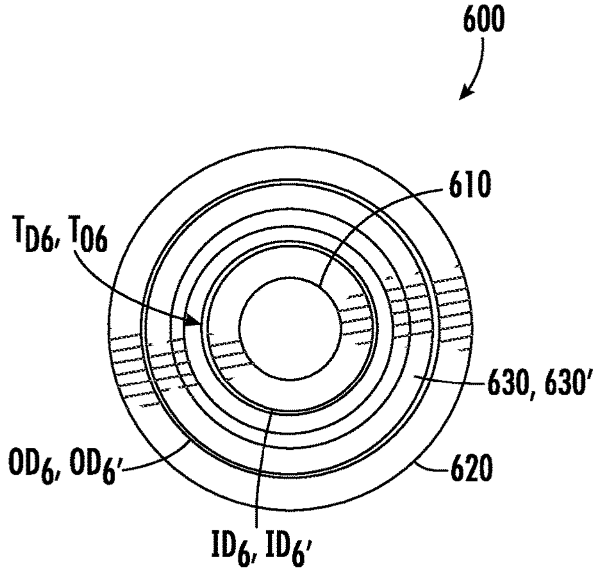
FIG. 6B is a front view of the compressible electrical assembly shown in FIG. 6A.
Figure 6C:
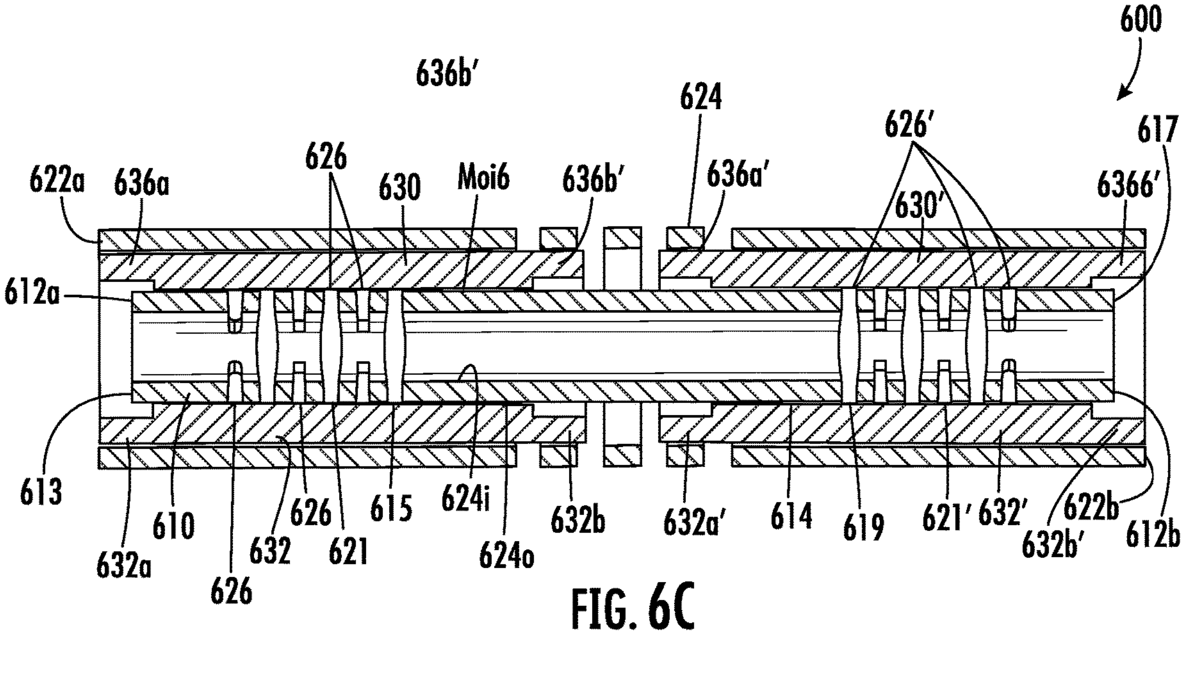
FIG. 6C is a cross-sectional view of the compressible electrical assembly shown in FIG. 6A.

FIGS. 6A-6C illustrate another embodiment of a compressible electrical assembly 600, including an inner compressible contact 610, an outer compressible contact 620, and a dielectric 630. Both the inner compressible contact 610 and the outer compressible contact 620 are shown in a substantially relaxed state, with the dielectric 630 disposed therebetween. Each element, as shown in the assembly, is shown arranged with respect to a common longitudinal axis L6.

Referring particularly to FIG. 6C, in this embodiment of the compressible electrical assembly 600, the inner compressible contact 610 includes a first inner contact end 612*a*, a second inner contact end 612*b* opposing the inner contact end, and a medial inner portion 614 positioned between the first inner contact end 612*a* and the second inner contact end 612*b*. The first inner contact end 612*a* extends from an outermost face 613 to an inner face 615. The second inner contact end 612*b* extends from an outermost face 617 to an inner face 619 of the second inner contact end 612*b*.

The outer compressible contact 620 includes a first outer contact end 622*a*, a second outer contact end 622*b* opposing the outer contact end, and a medial outer portion 624 positioned between the first outer contact end 622*a* and the second outer contact end 622*b*. The first outer contact end 622*a* extends from an outermost face 623 to an inner face 625 of the first outer contact end 622*a*. The second outer contact end 622*b* extends from an outermost face 627 to an inner face 629 of the second outer contact end 622*b*. Notably, the first outer contact end 622*a* and the second outer contact end 622*b* extend beyond the first outer inner end 612*a* and the second inner contact end 612*b*.

The medial inner portion 614 includes a divaricated cut section 611 with a plurality of divaricated cuts 616 and is also defined by a medial inner portion length, $M_{IL6}$, measured between inner faces 615, 619. Each divaricated cut in the inner compressible contact 610 is defined by at least one cut angle, as described with respect to FIGS. 1A-1C.

Defined in each inner contact end 622*a*, 622*b* is a divaricated-cut section 621, 621' having a plurality of divaricated cuts 626, 626'. In this version of the outer compressible contact 620, at least three divaricated cuts are shown are shown in each contact end. However, additional divaricated cuts may be included, depending on application requirements.

The medial inner portion 624 is tubular, divaricated-cut free, defined by an inner diameter 624*i* and outer diameter 624*o* and a medial inner portion length, $M_{OL6}$, measured between inner faces 625, 629.

In the compressible electrical assembly 600, two dielectrics 630, 630' are positioned between the inner compressible contact 610 and the outer compressible contact 620, as shown particularly in FIGS. 6B and 6C. Each dielectric 630, 630' has a dielectric body 632, 632' with a first body end 632*a*, 632*a*' and a second body end 632*b*, 632*b*' opposing the first body end 632*a*, 632*a*'. In this configuration, each dielectric has two overhang portion 636*a*, 636*a*'. 626*b*,

636*b*'. Each dielectric 630, 630' is also defined by an inner diameter $ID_6$, $ID_{6'}$ an outer diameter $OD_6$, $OD_{6'}$ and a dielectric thickness $T_{D6}$, $T_{D6'}$.

Figure 6D:
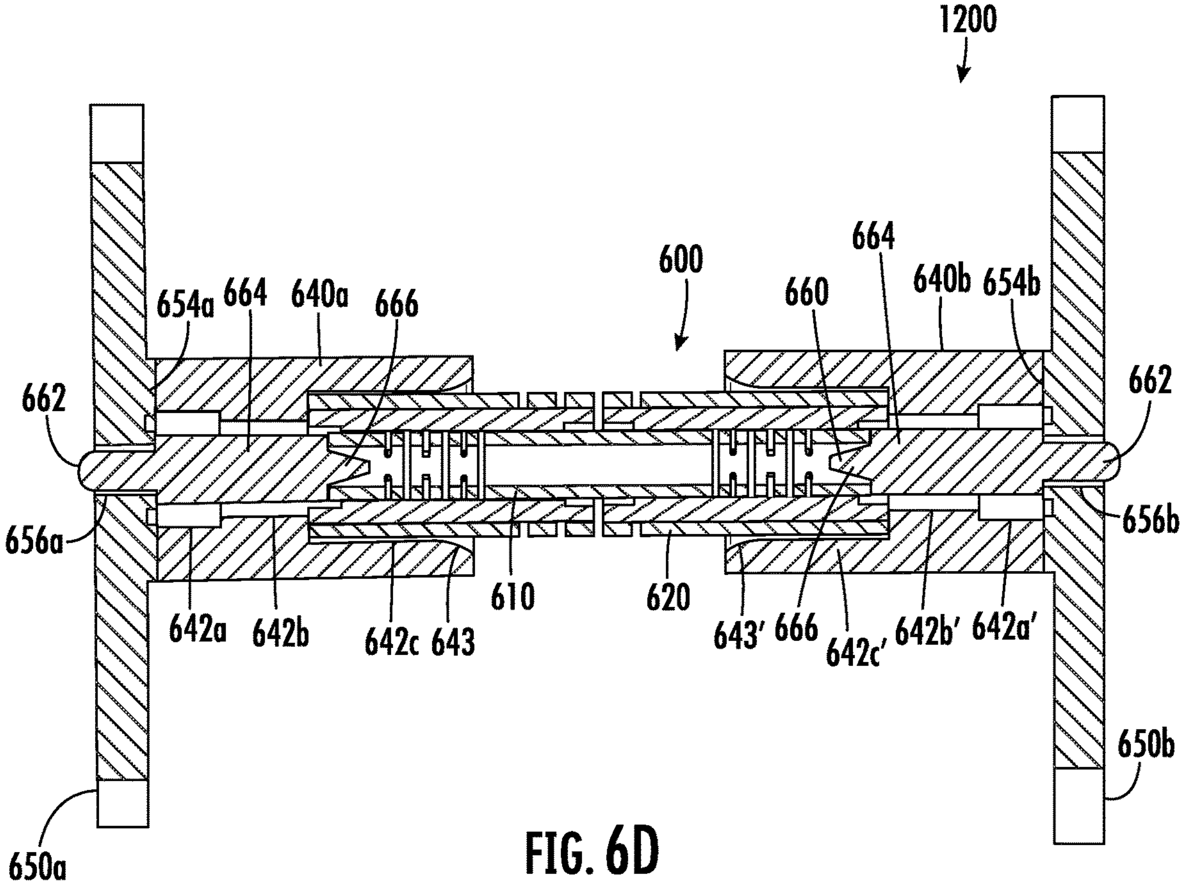
FIG. 6D is a cross-sectional view an assembly, including printed circuit boards, center contacts, housings, and the compressible electrical assembly shown in FIGS. 6A-6C.
Figure 10A:
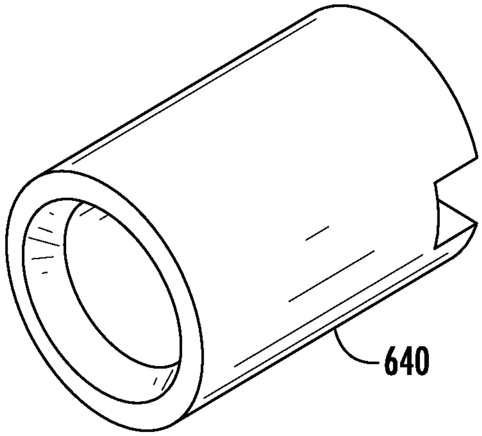
FIG. 10A is an isometric view of a housing and center contact assembly in accordance with embodiment disclosed herein.
Figure 10B:
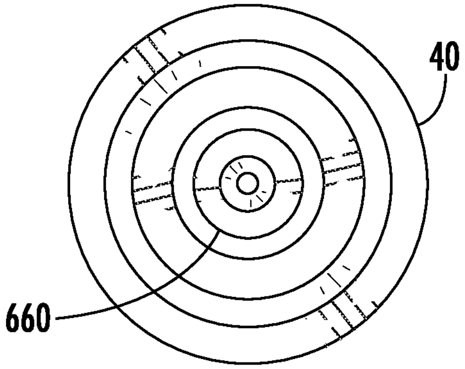
FIG. 10B is a front view of the housing and center contact assembly shown in FIG. 10A.
Figure 10C:
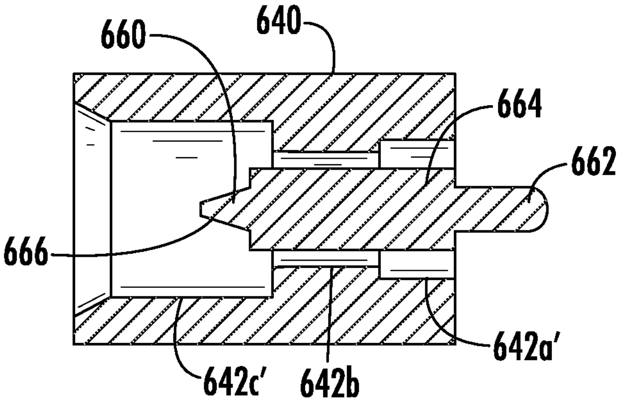
FIG. 10C is a cross-sectional view of the housing and center contact assembly shown in FIG. 10A.

FIG. 6D shows an exemplary connector system 1200, which includes the compressible electrical assembly 600, housings 640*a*, 640*b*, printed circuit boards 650*a*, 650*b*, and contacts 660*a*, 660*b*. FIGS. 10A-10C show additional views of the housings 640 assembled with contacts 660.

Each housing 640*a*, 640*b* helps to align the compressible electrical assembly 600 for signal transmission. Defined in the housing 640 are bores 642*a*, 642*b*, 642*c*, 642*a*', 642*b*', 642*c*'. Bores 642*c*, 642*c*' also have chamfers 643, 643' that facilitate insertion of the contact ends 622*a*, 622*b* into the housings.

Each printed circuit board 650*a*, 650*b* includes a base 652*a*, 652*b* and an engagement element 654*a*, 654*b* that couple with the compressible electrical assembly 600. Also each printed circuit board has at least one aperture 656*a*, 656*b* for positioning of contacts therein.

Figure 7A:
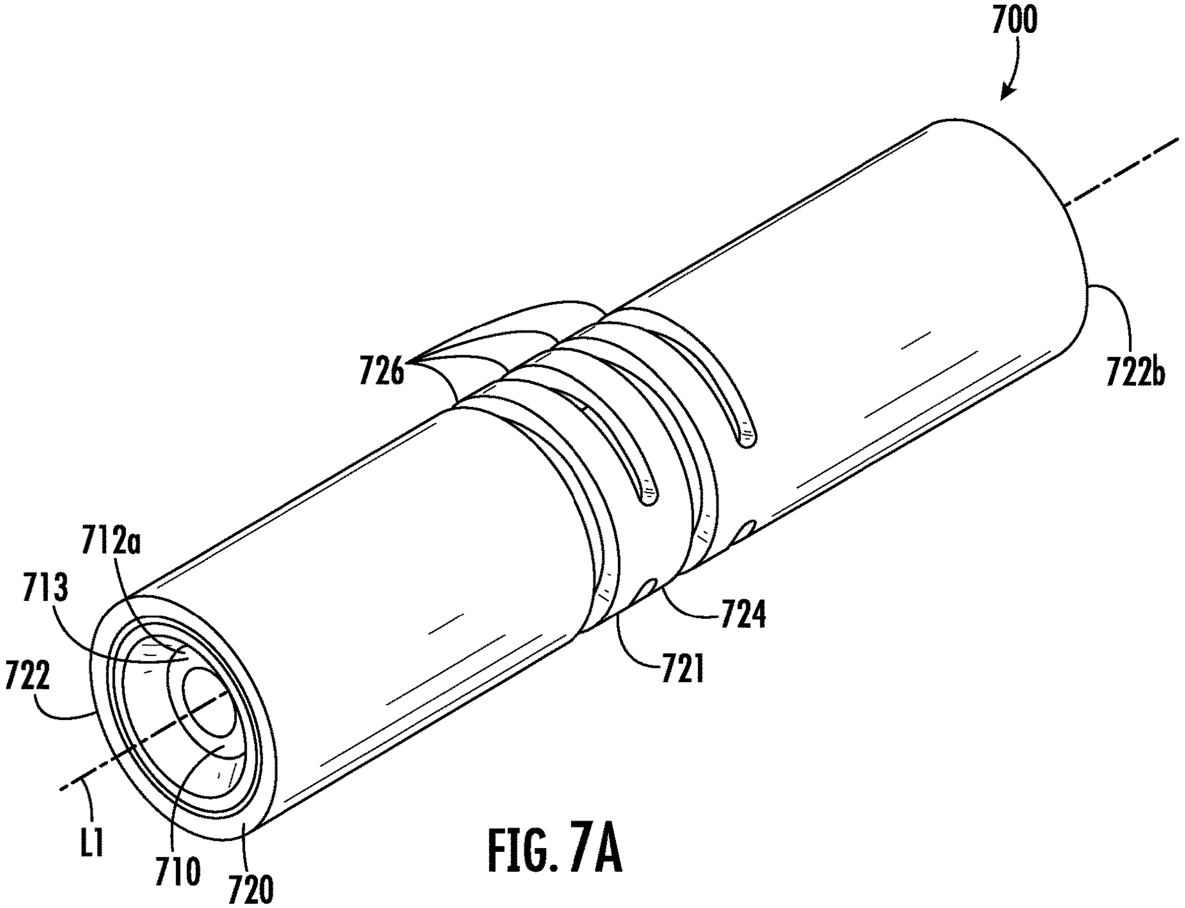
FIG. 7A is an isometric view of a housing and center contact assembly in accordance with embodiment disclosed herein.
Figure 7B:
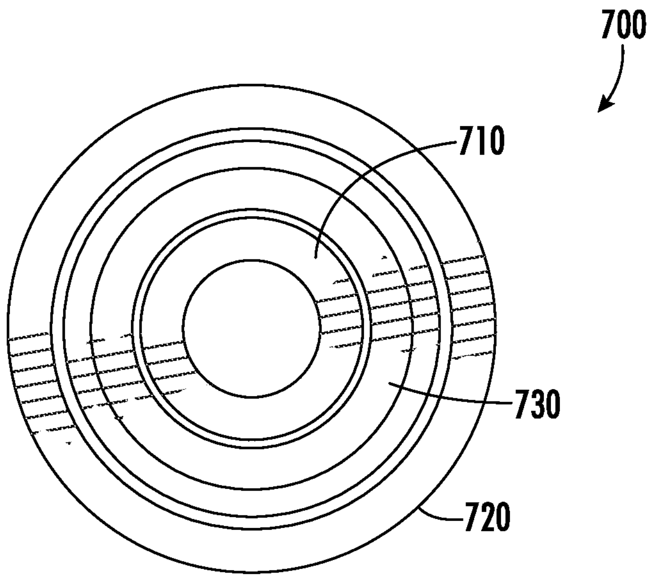
FIG. 7B is a front view of the housing and center contact assembly shown in FIG. 7A.
Figure 7C:
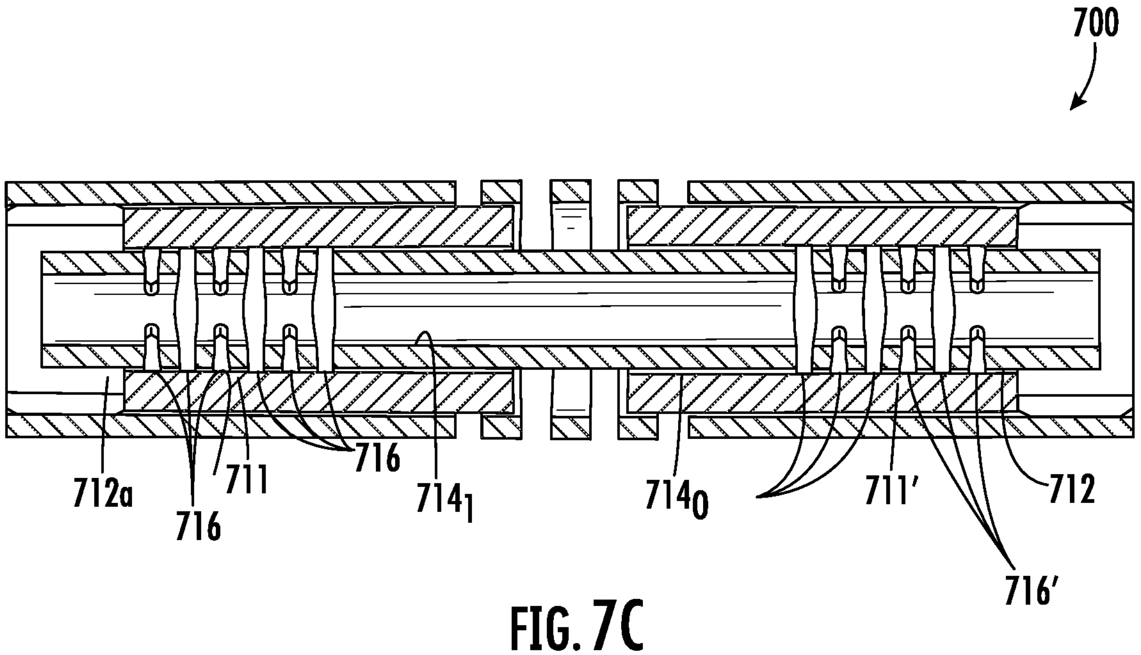
FIG. 7C is a cross-sectional view of the housing and center contact assembly shown in FIG. 7A.

FIGS. 7A-7C illustrate another embodiment of a compressible electrical assembly 700, including an inner compressible contact 710, an outer compressible contact 720, and a dielectric 730. Both the inner compressible contact 710 and the outer compressible contact 720 are shown in a substantially relaxed state, with the dielectric 730 disposed therebetween. Each element, as shown in the assembly, is shown arranged with respect to a common longitudinal axis L7.

Referring particularly to FIG. 7C, in this embodiment of the compressible electrical assembly 700, the inner compressible contact 710 includes a first inner contact end 712*a*, a second inner contact end 712*b* opposing the inner contact end, and a medial inner portion 714 positioned between the first inner contact end 712*a* and the second inner contact end 712*b*. The first inner contact end 712*a* extends from an outermost face 713 to an inner face 715. The second inner contact end 712*b* extends from an outermost face 717 to an inner face 719 of the second inner contact end 712*b*.

The outer compressible contact 720 includes a first outer contact end 722*a*, a second outer contact end 722*b* opposing the outer contact end, and a medial outer portion 724 positioned between the first outer contact end 722*a* and the second outer contact end 722*b*. The first outer contact end 722*a* extends from an outermost face 723 to an inner face 725 of the first outer contact end 722*a*. The second outer contact end 722*b* extends from an outermost face 727 to an inner face 729 of the second outer contact end 722*b*. Notably, the first outer contact end 722*a* and the second outer contact end 722*b* extend beyond the first outer inner end 712*a* and the second inner contact end 712*b*.

The medial inner portion 714 includes a divaricated cut section 711 with a plurality of divaricated cuts 716 and is also defined by a medial inner portion length, $M_{IL7}$, measured between inner faces 715, 719. Each divaricated cut in the inner compressible contact 710 is defined by at least one cut angle, as described with respect to FIGS. 1A-1C.

Defined in each inner contact end 712*a*, 722*b* is a divaricated-cut section 711, 711' having a plurality of divaricated cuts 716, 716'. In this version of the outer compressible contact 720, at least three divaricated cuts are shown are shown in each contact end. However, additional divaricated cuts may be included, depending on application requirements.

The medial inner portion 724 is tubular, divaricated-cut free, defined by an inner diameter 724*i* and outer diameter 724*o* and a medial inner portion length, $M_{OL7}$, measured between inner faces 725, 729.

In the compressible electrical assembly 700, two dielectrics 730, 730' are positioned between the inner compressible contact 710 and the outer compressible contact 720, as shown particularly in FIGS. 7B and 7C. Each dielectric 730, 730' has a dielectric body 732, 732' with a first body end 732*a*, 732*a*' and a second body end 732*b*, 732*b*' opposing the first body end 732*a*, 732*a*'. Each dielectric 730, 730' is also defined by an inner diameter $ID_7$, $ID_{7'}$ an outer diameter $OD_7$, $OD_{7'}$ and a dielectric thickness $T_{D7}$, $T_{D7'}$.

Figure 8A:
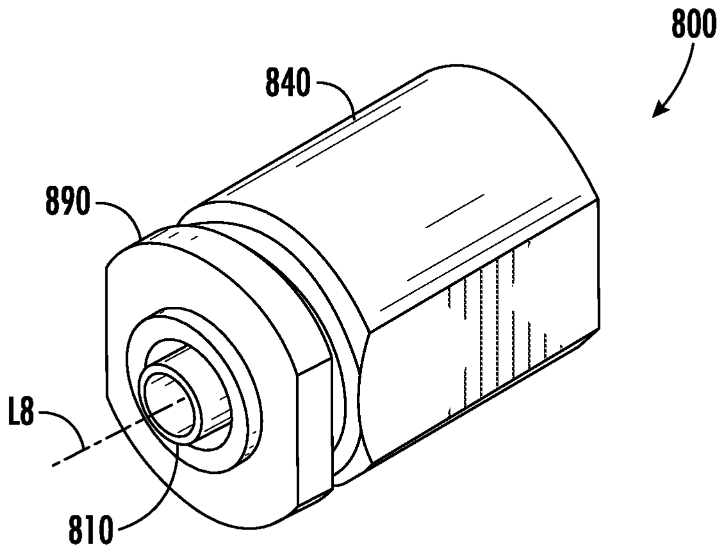
FIG. 8A is another isometric view of a compressible electrical assembly in accordance with embodiments disclosed herein.
Figure 8B:
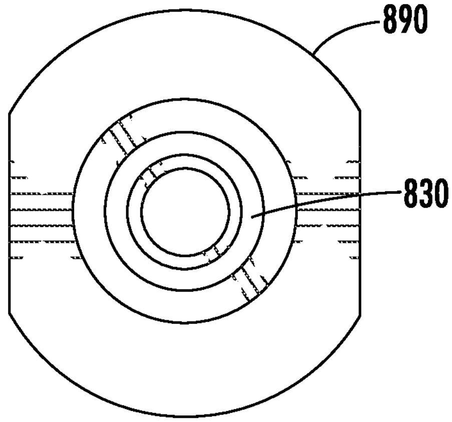
FIG. 8B is a front view of the compressible electrical assembly, shown in FIG. 8A.
Figure 8C:
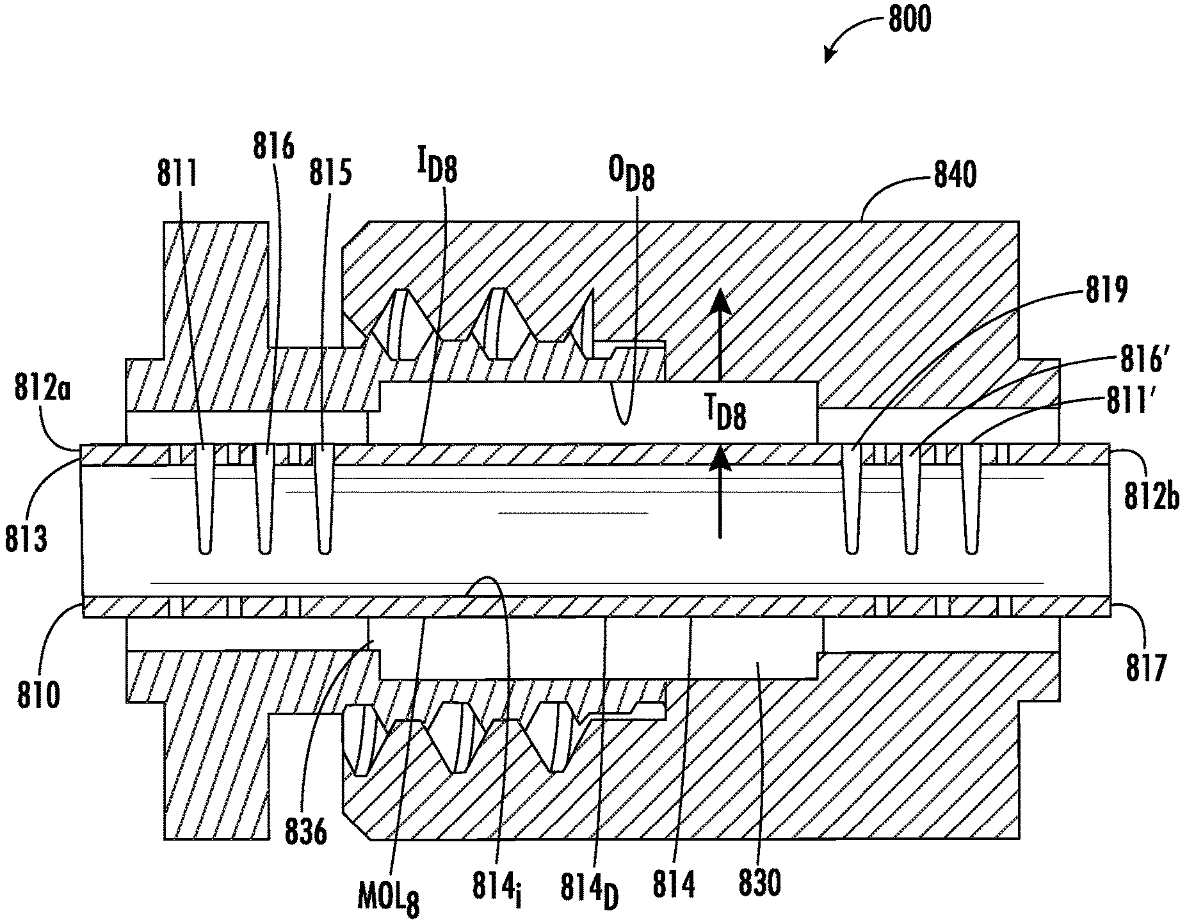
FIG. 8C is a cross-sectional view of the compressible electrical assembly shown in FIG. 8A.

FIGS. 8A-8C illustrate another embodiment of a compressible electrical assembly 800, including an inner compressible contact 810, a forward housing 890, and a rearward housing 840 threaded with the forward housing 890. The inner compressible contact 810 is shown in a substantially relaxed state, with the dielectric 830 disposed between the inner compressible contact 810, the forward housing 890, and the rearward housing 840. Each element, as shown in the assembly, is shown arranged with respect to a common longitudinal axis L8.

Referring particularly to FIG. 8C, in this embodiment of the compressible electrical assembly 800, the inner compressible contact 810 includes a first inner contact end 812*a*, a second inner contact end 812*b* opposing the inner contact end, and a medial inner portion 814 positioned between the first inner contact end 812*a* and the second inner contact end 812*b*. The first inner contact end 812*a* extends from an outermost face 813 to an inner face 815. The second inner contact end 812*b* extends from an outermost face 817 to an inner face 819 of the second inner contact end 812*b*.

Defined in each inner contact end 812*a*, 812*b* is a divaricated-cut section 811, 811' having a plurality of divaricated cuts 816, 816'. The medial inner portion 614 is tubular, divaricated-cut free, and defined by an inner diameter 614*i* and outer diameter 614*o* and a medial inner portion length, $M_{OL8}$, measured between inner faces 815, 819.

In the compressible electrical assembly 800, one dielectric 830 is positioned between the inner compressible contact 810, the forward housing 890, and the rearward housing 840, as shown particularly in FIGS. 8B and 8C. The dielectric 830 has a dielectric body 832 with a first body end 832*a* and a second body end 832*b* opposing the first body end 832*a*. In this configuration, the dielectric 830 has an overhang portion 836 and is also defined by an inner diameter $ID_8$, an outer diameter $OD_8$, and a dielectric thickness $T_{D8}$.

Figure 8D:
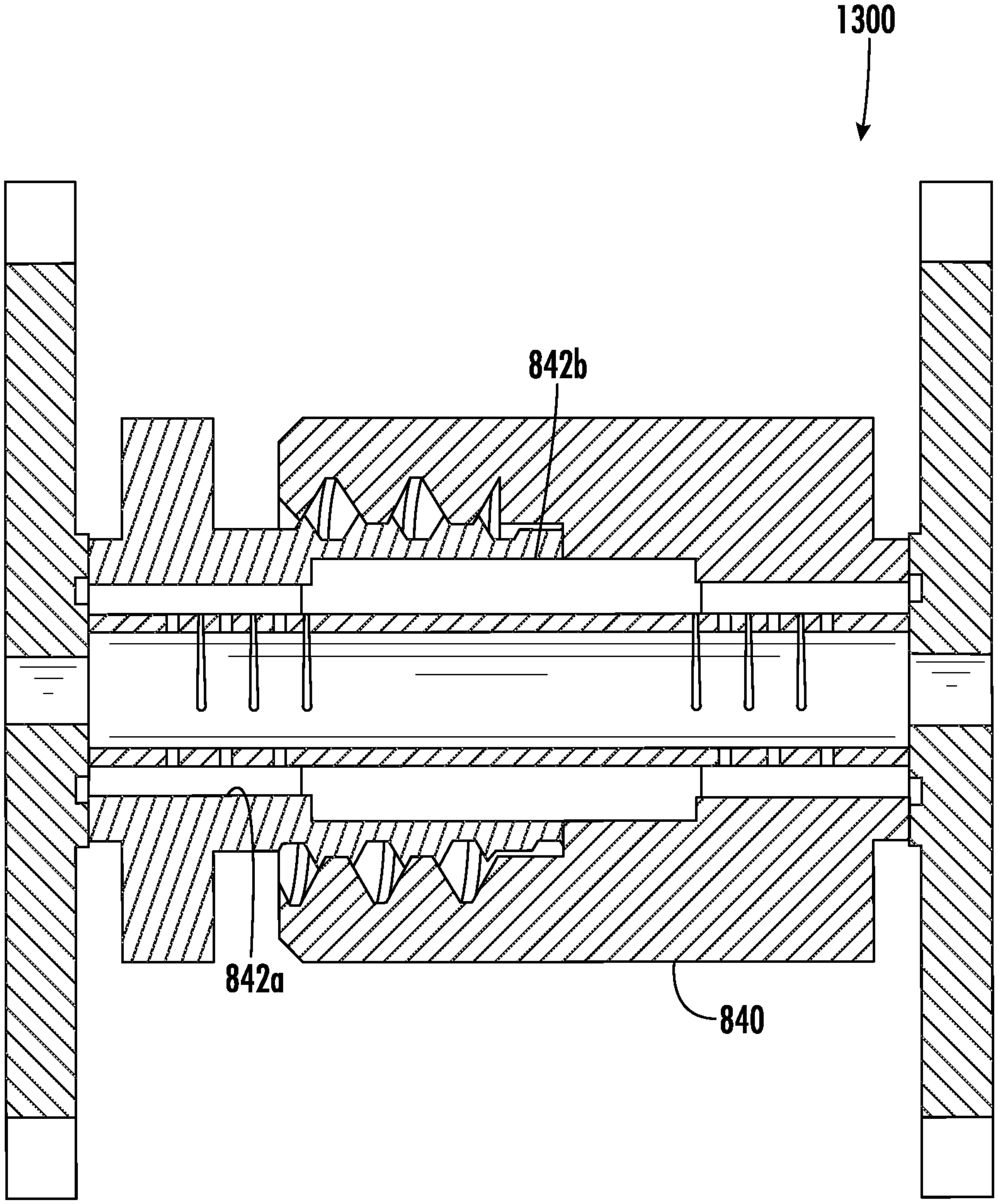
FIG. 8D is a cross-section view of a connector system, including the housing and center contact assembly, shown in FIGS. 8A-8C, printed circuit boards, and a compressible electrical contact.

FIG. 8D shows an exemplary connector system 1300, which includes the compressible electrical assembly 800, housings 840, 890, and printed circuit boards 850*a*, 850*b*. Each housing 840, 890 helps to align the compressible electrical assembly 800 for signal transmission. Defined in the housing 840 are bores 842*a*, 842*b*. Each printed circuit board 850*a*, 850*b* includes a base 852*a*, 852*b* and an engagement element 854*a*, 854*b* that couple with the compressible electrical assembly 800. Also each printed circuit board has at least one aperture 856*a*, 856*b* for positioning of contacts therein.

It will be apparent to those skilled in the art that various modifications and variations can be made without departing from the spirit or scope of the disclosed embodiments. Since modifications combinations, sub-combinations and variations of the disclosed embodiments, incorporating the spirit and substance of the embodiments may occur to persons skilled in the art, the disclosed embodiments should be construed to include everything within the scope of the appended claims and their equivalents.

What is claimed is:

1. A compressible electrical assembly, comprising:

an inner compressible contact, comprising a first inner contact end, a second inner contact end opposing the first inner contact end, and a medial inner portion positioned between the first inner contact end and the second inner contact end;

an outer compressible contact, comprising a first outer contact end, a second outer contact end opposing the first outer contact end, and a medial outer portion positioned between the first outer contact end and the second outer contact end; and a dielectric substantially disposed between the medial inner portion and the medial outer portion, wherein defined in each of the first inner contact end, the second inner contact end, the first outer contact end, and the second outer contact end is a plurality of divaricated cuts, wherein a channel is defined in the dielectric, and wherein the channel is lateral and extends fully along the dielectric.

2. The compressible electrical assembly of claim 1, wherein the medial inner portion is substantially tubular.

3. The compressible electrical assembly of claim 1, wherein the medial outer portion is substantially tubular.

4. The compressible electrical assembly of claim 1, wherein the first inner contact end extends beyond the first outer contact end.

5. The compressible electrical assembly of claim 1, wherein the second inner contact end extends beyond the second outer contact end.

6. The compressible electrical assembly of claim 1, wherein the medial outer portion comprises a radially disposed crimped area centrally positioned along the medial outer portion.

7. The compressible electrical assembly of claim 1, wherein the dielectric has a portion configured to be disposed within a radially disposed notch of the medial outer portion.

8. The compressible electrical assembly of claim 1, wherein the medial outer portion comprises a centrally disposed crimped portion, having a curvature that extends inwardly toward the medial inner portion.

9. The compressible electrical assembly of claim 1, wherein the first outer contact end extends beyond the first inner contact end.

10. The compressible electrical assembly of claim 1, wherein the second outer contact end extends beyond the second inner contact end.

11. The compressible electrical assembly of claim 1, wherein the inner compressible contact comprises a material selected from the group consisting of brass, copper, beryllium copper, and stainless steel.

12. The compressible electrical assembly of claim 1, wherein defined in the medial outer portion is an opening.

13. The compressible electrical assembly of claim 12, wherein a retaining element is at least partially contained in the opening.

14. The compressible electrical assembly of claim 1, wherein the dielectric comprises a first dielectric end and a second dielectric end opposing the first dielectric end and wherein the first dielectric end extends beyond the first inner contact end and the second dielectric end extends beyond of second inner contact end.

15. The compressible electrical assembly of claim 1, wherein each of the plurality of divaricated cuts is defined by at least one cut angle measured between a pair of opposing inner surfaces when in a substantially relaxed state, and wherein in a substantially compressed state, each pair of opposing inner surfaces collapses inwardly to form a slot.

16. The compressible electrical assembly of claim 1, wherein the dielectric comprises a first dielectric end and a second dielectric end and wherein the first dielectric end and the second dielectric end extend downwardly toward an inner diameter of the inner compressible contact.

17. A compressible electrical assembly, comprising:

an inner compressible contact, comprising a first inner contact end, a second inner contact end opposing the first inner contact end, and a medial inner portion positioned between the first inner contact end and the second inner contact end;

an outer compressible contact, comprising a first outer contact end, a second outer contact end opposing the first outer contact end, and a medial outer portion positioned between the first outer contact end and the second outer contact end; and a dielectric substantially disposed between the medial inner portion and the medial outer portion, wherein a channel is defined in the dielectric, and wherein the channel is lateral and extends fully along the dielectric, wherein defined in the medial outer portion is a plurality of divaricated cuts, and wherein each of the plurality of divaricated cuts is defined by at least one cut angle measured between a pair of opposing inner surfaces when in a substantially relaxed state, and wherein in a substantially compressed state, each pair of opposing inner surfaces collapses inwardly to form a slot.

18. A compressible electrical assembly, comprising:

an inner compressible contact, comprising a first inner contact end, a second inner contact end opposing the first inner contact end, and a medial inner portion positioned between the first inner contact end and the second inner contact end;

an outer compressible contact, comprising a first outer contact end, a second outer contact end opposing the first outer contact end, and a medial outer portion positioned between the first outer contact end and the second outer contact end; and a dielectric substantially disposed between the medial inner portion and the medial outer portion, wherein defined in each of the first inner contact end, the second inner contact end, the first outer contact end, and the second outer contact end is a plurality of divaricated cuts, wherein the first inner contact end extends beyond the first outer contact end.

19. A compressible electrical assembly, comprising:

an inner compressible contact, comprising a first inner contact end, a second inner contact end opposing the first inner contact end, and a medial inner portion positioned between the first inner contact end and the second inner contact end;

an outer compressible contact, comprising a first outer contact end, a second outer contact end opposing the first outer contact end, and a medial outer portion positioned between the first outer contact end and the second outer contact end; and a dielectric substantially disposed between the medial inner portion and the medial outer portion, wherein defined in each of the first inner contact end, the second inner contact end, the first outer contact end, and the second outer contact end is a plurality of divaricated cuts, and wherein the second inner contact end extends beyond the second outer contact end.

* * * * *